United States Patent [19]

Parker et al.

[11] 4,214,269

[45] Jul. 22, 1980

[54] REAL TIME DIGITAL SCAN CONVERTER

[75] Inventors: Edward J. Parker, Seattle; James C. Behlen, Jr., Redmond, both of Wash.

[73] Assignee: Advanced Technology Laboratories, Inc., Bellevue, Wash.

[21] Appl. No.: 19,321

[22] Filed: Mar. 9, 1979

[51] Int. Cl.² .............................................. H04N 5/02
[52] U.S. Cl. ................................. 358/140; 343/5 DP; 343/5 SC
[58] Field of Search .......... 358/140; 343/5 SC, 5 DP, 343/6 TV

[56] References Cited

U.S. PATENT DOCUMENTS

| 3,765,018 | 10/1973 | Heard | 343/5 SC |
|---|---|---|---|
| 3,810,174 | 5/1974 | Heard | 343/5 DP |
| 4,002,827 | 1/1977 | Nevin | 358/140 |
| 4,065,770 | 12/1977 | Berry | 343/5 SC |
| 4,099,179 | 7/1978 | Hofstein | 343/5 SC |
| 4,149,252 | 4/1979 | Miller | 358/140 |
| 4,167,753 | 9/1979 | Lynk | 358/140 |

Primary Examiner—Howard W. Britton

Attorney, Agent, or Firm—Christensen, O'Connor, Johnson & Kindness

[57] ABSTRACT

A digital scan converter is disclosed for processing the sequence of analog signals supplied by a sector scanning surveillance system to form a signal compatible with television type display devices. The signals supplied by the surveillance system are digitized by an analog-to-digital converter at a rate proportional to the cosine of the azimuthal scan angle that is associated with each analog signal to thereby effect a first portion of the required conversion from the polar coordinate format of the surveillance system to the Cartesian coordinate format of the television display. The digitized signals are stored in a memory so as to permit addressing of a set of stored data that corresponds to one horizontal trace of the television display. The data sets corresponding to successive horizontal lines of the television display are sequentially accessed in accordance with conventional television timing signals and data is serially read from memory and supplied to a digital-to-analog converter at a rate that completes the required polar-to-Cartesian format conversion.

18 Claims, 14 Drawing Figures

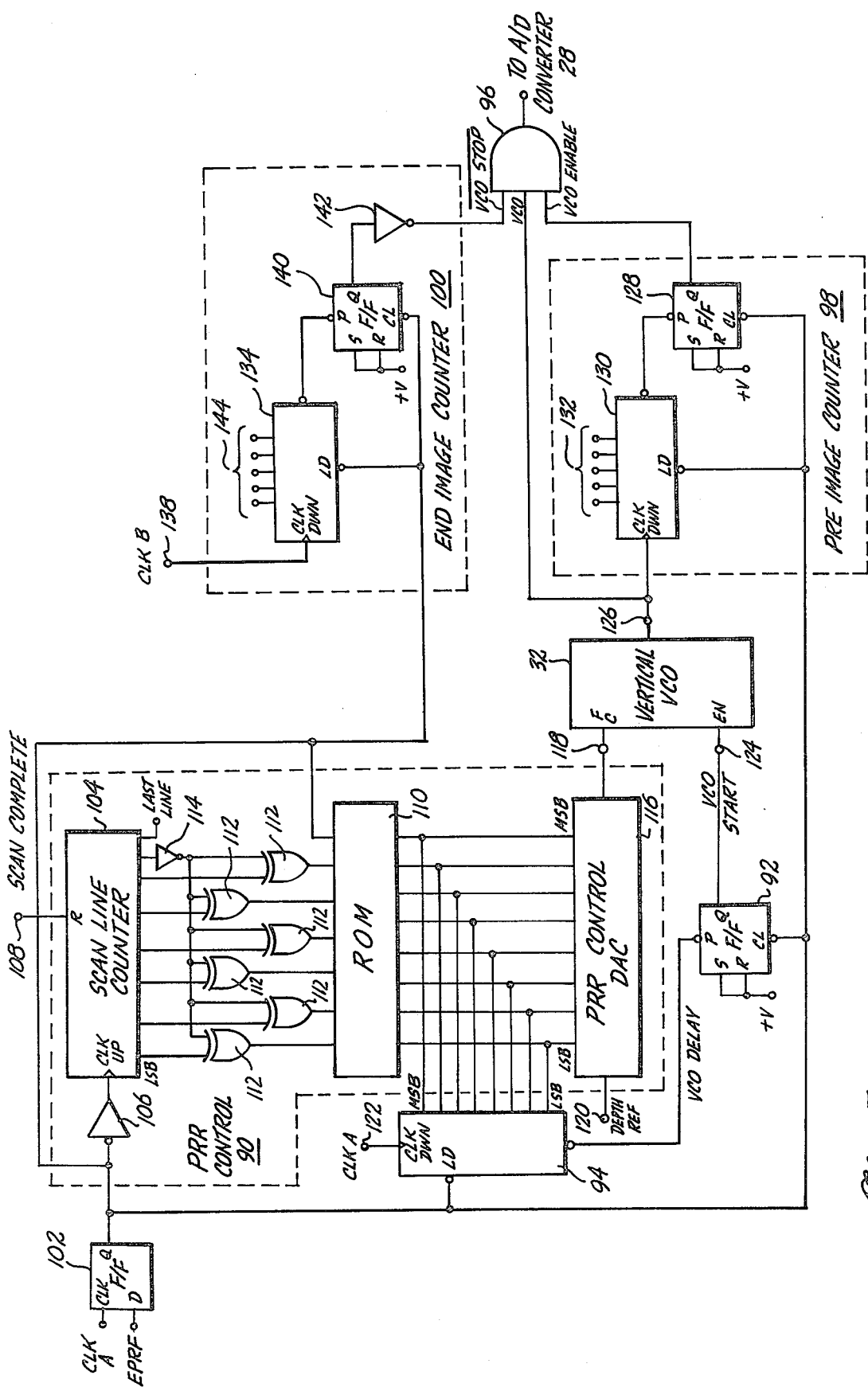

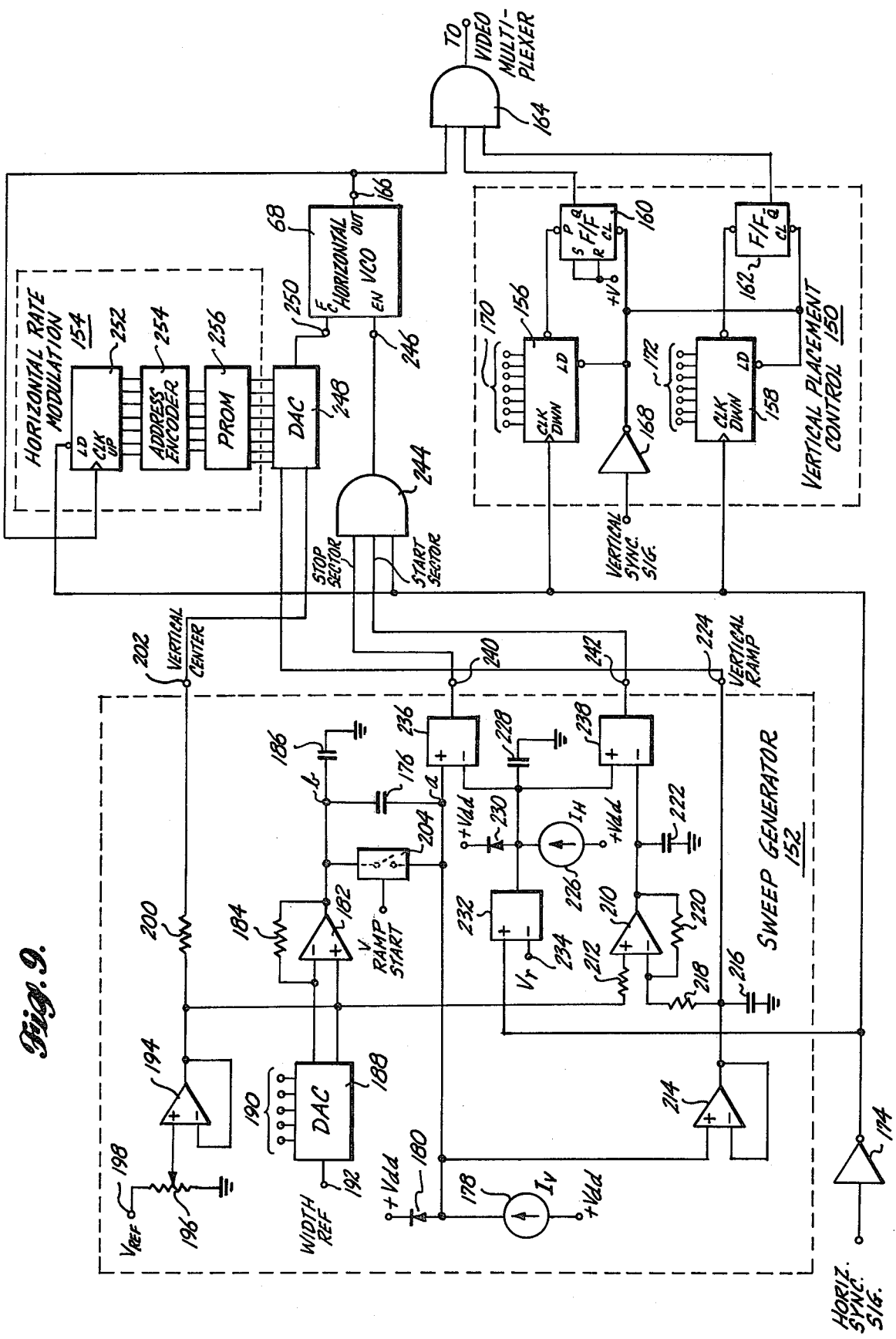

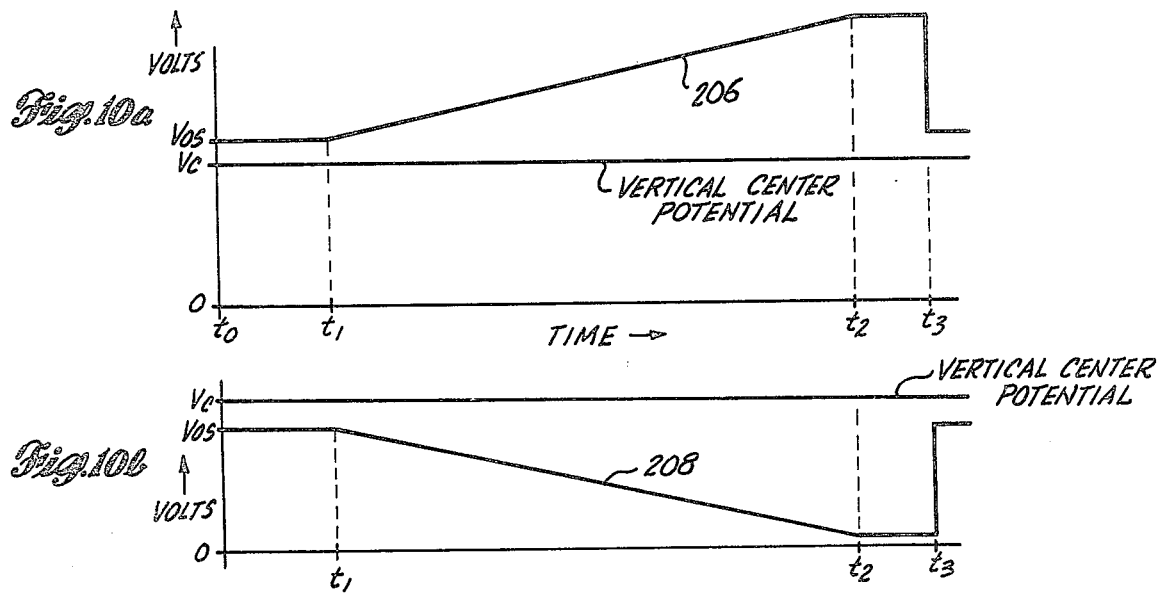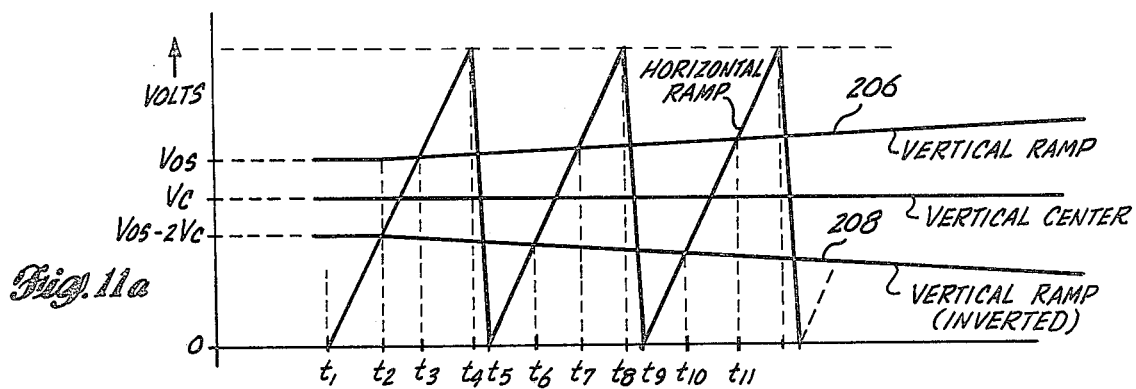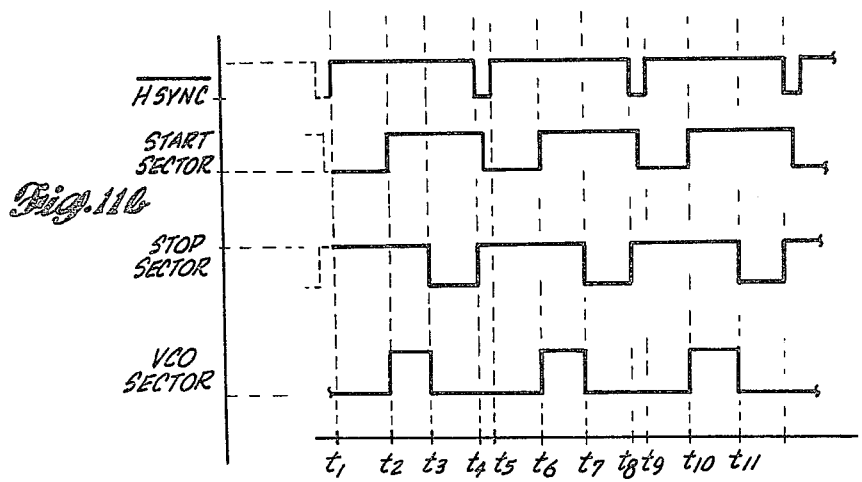

REAL TIME DIGITAL SCAN CONVERTER

BACKGROUND OF THE INVENTION

This invention relates to apparatus for converting signal information that is made available by a pulse-echo surveillance system or other source at a particular rate and in a particular coordinate format into signals compatible with various visual imaging or display devices that operate at a different rate and with reference to a different coordinate format. More specifically, this invention relates to digital scan converters of the type that convert analog input data which is referenced to a polar coordinate system into a Cartesian coordinate format to thereby permit visual information display with conventional apparatus such as a television receiver.

There are many situations in which information is gathered or received at a particular rate and with reference to one type of coordinate system wherein it is desired or necessary to convert the received information into a different coordinate format for utilization at a rate that may be substantially different than the rate at which the information is gathered or received. For example, various surveillance apparatus such as slow scan radars, ultrasonic imaging and sonar systems scan a sectorial region of an object or the surrounding environment by emitting a series of energy pulses which propagate outwardly along angularly spaced apart, radially directed paths and by detecting return or echo signals that occur when the emitted pulses are scattered by reflective structure that lies within the propagation paths. Since the time which elapses between the emission of a particular energy pulse and the associated return signal (or any portion thereof) is related to the distance between the structure causing the signal reflection and the source of the energy, the return signal can be processed to provide a two-dimensional visual representation of the scanned region. In this respect and regardless of the particular structure employed, the operation of such surveillance systems can be conceptually considered as the rotation of a single transducer element through a total scanning angle by repeatedly moving the transducer through small incremental angular steps while emitting a pulse of energy and receiving the associated return signal at each angular position of the transducer. Thus, the signals provided by sector scanning surveillance systems are essentially based on a polar coordinate system wherein the emitted energy can be mathematically modeled as a point source that is located at the origin of the polar coordinate system; the value of the angular or azimuthal coordinate, $\theta$, expresses the direction of an emitted pulse of energy and its associated return signal; and the value of the radial coordinate, r, expresses the radial distance between the transducer and the structure causing the reflective energy scattering. On the other hand, the operation of most modern display devices can be considered to be based on a Cartesian coordinate system in which the image being displayed is generated by rapidly and successively producing small incremental regions of illumination on the face of a cathode ray tube or a mosaic of electroluminescent elements while modulating the intensity of the illumination in accordance with the image being formed. In this respect, in order to provide high image resolution the incremental elements of such display devices must be relatively small and must be successively energized at a relatively high rate in order to update or refresh the visual display at a rate which provides "flicker free" viewing. The rate at which return signals are provided by a surveillance system may, of course, differ substantially from the rates at which flicker free visual displays can be produced and, in many situations, the display rate may be fixed by convention or other design constraints. For example, in a conventional black and white television display an electron beam impinges on a phosphorous coating that is applied to the rear surface of the television viewing screen to produce a small spot of illumination having an intensity that is proportional to the electron beam current. To provide the displayed image, the electron beam is swept horizontally across the face of the screen at a rate of 15,750 sweeps per second while being swept from the top to the bottom of the screen at a 60 Hertz rate. Therefore, each image frame is comprised of 525 horizontal sweeps during each of which the electron beam sweeps across the screen to excite the phosphorous coating during approximately a 55 microsecond interval and retraces to the original vertical border of the screen in approximately 8 microseconds. With reference to vertical displacement, one-half of the horizontal sweeps are effected during one period of the 60 Hertz vertical scanning rate and the final one-half of the horizontal sweeps are effected in spatial alternation with the previously generated horizontal sweeps during the next period of the 60 Hertz vertical sweep rate to thereby completely update or refresh the image being displayed at a rate of approximately 30 Hertz.

Various digital scan converters have been proposed for accepting data at the rate at which it is made available by a surveillance system or other source that, in effect, operates with reference to a polar coordinate system and providing the data at a different rate while simultaneously facilitating display of the data by a device that, in effect, operates with respect to a Cartesian coordinate system. Basically, such prior art digital scan converters sample each reflected signal at a predetermined rate to provide a set of digitally encoded signals (digital words) that represent the amount of reflection occurring from spaced apart locations along the radially extending scan line that was traversed by both the transmitted energy pulse and the associated return signal. Since, as was previously noted, sector scanning surveillance systems sequentially emit pulses along a plurality of angularly oriented scan lines in order to provide a two-dimensional surveillance region of sectorial geometry, one complete scanning sequence produces a plurality of sets of digital words wherein each set of digital words represents reflections occurring along a particular scan line and successive sets of digital words occur at the pulse repetition rate of the surveillance system. The sets of digital words are then stored in a memory device such as a random access memory (RAM) in a format which identifies each digital word with a corresponding spatial position within the scan region. The stored digital words are then read from the memory device at a rate compatible with the display apparatus of interest and are typically converted to an analog signal suitable for use with such display apparatus.

One example of a prior art digital scan converter of the abovedescribed type is disclosed in Heard et al., U.S. Pat. No. 3,810,174, in which an analog-to-digital (A/D) converter is clocked at a constant rate representing a desired range increment to produce digitized signals which are accumulated in a buffer memory until a data group corresponding to one complete scan line of an associated radar system is available and a preassigned area within a first track of a multitrack drum-type magnetic memory is available for storing that data group. When both conditions are satisfied, the accumulated data is written into the preassigned region of the drum memory, which also includes a second track that carries the address of that scan line, i.e., the azimuthal angle of a polar coordinate system when the data being stored results from a sector scanning surveillance system of the type hereinbefore described. Recorded data is then cyclically read from the drum memory and converted to an analog signal at a rate suitable for operating the x and y deflection and the z axis intensity circuits of a conventional cathode ray tube display apparatus. In this respect and in order to display the information being read from the drum memory with a proper Cartesian orientation, the digitally encoded addresses of the data being displayed are converted to an analog ramp signal so that the instantaneous amplitude of the ramp is representative of the angular azimuthal coordinate of the particular group of data being displayed. Two analog function generators respectively supply a signal representative of the sine and cosine of that particular azimuthal angle. These signals are respectively coupled to the x and y deflection circuits of the cathode ray tube. According to the above-referenced Heard et al. patent, this modulation of the cathode ray tube x and y deflection signals causes the electron beam to be continuously displaced so that the resulting visual display exhibits proper polar coordinate perspective.

With respect to the display of sector shaped data fields, it can be noted that a digital scan converter of the type disclosed in the above-referenced patent to Heard et al. is not suitable for use with the display format utilized in conventional television systems since, as previously described, the electron beam of a television display device cannot be deflected in the vertical direction during each of the horizontal sweep operations.

U.S. Pat. No. 3,765,018, also issued to Heard et al., and U.S. Pat. No. 4,065,770, issued to Berry, describe prior art digital scan converters that are similar to the apparatus disclosed in the previously referenced patent to Heard et al. in that: (1) each return signal of a sector scanning radar system is effectively sampled and digitized by an A/D converter which operates at a constant rate determined by the scan rate of the associated radar system; (2) the digital words resulting from the A/D conversion, which represent reflections originating at equally spaced apart locations along a series of angularly oriented scan lines are stored in a memory; and (3) the stored data is accessed at a rate compatible with a display device such as a conventional television receiver and is converted to an analog signal for driving such a display device. In the digital scan converters of both of these references, the memory is a random access memory (RAM), and conversion between a polar coordinate system that is associated with the radar system and a Cartesian coordinate system in which lines having a constant y coordinate horizontally traverse the image display is effected as the digital words are written into the storage locations of the RAM. In particular, as the A/D converter supplies each digital word, the digital scan converters of the these references determine the azimuthal coordinate $\theta$ and the radial coordinate $r$ which correspond to the associated unique physical location along that particular scan line. The projection of the radial coordinate on both the x and y axis of the desired Cartesian system is then calculated and the digital word provided by the A/D converter is stored in the RAM at a storage location that can be addressed in terms of the resulting x and y coordinate values. In the apparatus of the Heard et al. patent, the RAM is, in essence, arranged as a rectangular array that corresponds to the Cartesian display format and the horizontal traces of the displayed image are produced by successively accessing adjacent rows of the memory array. In the patent to Berry, the sector scanning surveillance system is a ground mapping radar that is mounted in a moving aircraft or other vehicle so that the polar coordinate system associated with the input data moves relative to a fixed point on the ground. To permit convenient display relative to the Cartesian coordinate system of a television screen located within the aircraft, the above-mentioned polar-to-Cartesian coordinate transformation is effected relative to a Cartesian reference that remains fixed relative to the ground and a fairly complex addressing scheme is implemented which compensates for movement of the aircraft relative to the ground.

Nevin, U.S. Pat. No. 4,002,827, discloses yet another digital scan converter that includes a A/D converter, a RAM, and a D/A converter wherein the reference signal associated with each radially extending scan line of a sector scan radar system is digitized, stored in the RAM at a rate determined by the radar scanning rate and the stored data is accessed at a rate compatible with a display device that operates in a Cartesian coordinate format. In the apparatus disclosed by Nevin, the conversion from polar coordinate format to Cartesian coordinate format is effected as the digital words supplied by the A/D converter are loaded into the RAM so that the RAM can be considered to be a rectangular matrix having storage locations corresponding to incremental cells of the surveillance region to be displayed. Although this technique is also employed in previously referenced U.S. Pat. Nos. 3,765,018 and 4,065,770, the apparatus disclosed by Nevin does not operate at a constant sampling rate, but is driven by a clock circuit which exhibits a pulse repetition rate that is proportional to the cosine of the azimuthal angle defining the polar orientation of the scan line associated with the return signal being processed. This means that the return signal associated with a particular scan line is digitized at a slower rate than adjacent scan lines having a smaller angular coordinate and, relative to the Cartesian coordinate system of the display device, the successive digital words of each reflected signal will lie on successive, parallel traces that are equally spaced apart and exhibit a constant y coordinate. To place each digital word into a storage location of the RAM having the proper orientation relative to the x axis of the desired Cartesian coordinate system, the apparatus disclosed by Nevin operates in the manner discussed relative to the previously referenced U.S. Pat. Nos. 3,765,018 and 4,065,770. That is, as the A/D converter supplies a digital word, the r coordinate of the corresponding location along the scan line being processed is determined and multiplied by the sine of the azimuthal angle to derive an address signal that will cause the digital word to be placed in the proper storage location of the RAM. Since, in the apparatus disclosed by Nevin, each row of the rectangular array of the RAM corresponds to one complete horizontal trace of the desired display, an analog signal compatible with conventional TV display devices is formed by successively reading the stored data on a row-by-row basis with each row of data being clocked into a D/A converter at a constant rate that is compatible with the conventional TV horizontal sweep rate. During this process, a conventional composite television sync signal is added to the analog video information.

Although the apparatus disclosed in the above-referenced U.S. Pat. Nos. 3,765,018; 4,002,827 and 4,065,770 may provide satisfactory results under some circumstances, several disadvantages and drawbacks are encountered. First, since the digital scan converters disclosed in these references perform the desired polar-to-Cartesian format conversion as surveillance information is entered into a memory which includes an adequate number of storage locations to represent each small incremental region of spatial cell of the face of the display device, the memory devices utilized therein must have substantial storage capability. For example, in the embodiment of a scan converter disclosed by Nevin for displaying a sectorial surveillance region on a television screen, the display region of the television screen is considered to comprise 512 horizontal traces consisting of 512 equally spaced apart "dots" so that the face of the television screen is, in effect, an array containing 262,144 such dots. Thus, if the surveillance information is encoded into four-bit digital words by the A/D converter, a RAM having a 1 megabit storage capability is required even though relatively few of the storage locations will actually hold signal information. In particular, in displaying a sectorial surveillance region on the substantially rectangular face of a television screen, a major portion of the screen area will be outside of the imaged surveillance sector and hence the RAM storage locations corresponding to this region of the television screen are not utilized to store image information. However, as previously noted, these storage locations are required in the apparatus disclosed by Nevin so that when data is read from memory at a constant clock rate the D/A converter will supply a television compatible analog signal having proper amplitude versus time characteristics.

The apparatus disclosed in the above-referenced patents not only utilize more memory than is necessary to store the desired surveillance information, but implementation of the disclosed apparatus requires a substantial amount of rather complex circuit arrangements. In this regard, the apparatus disclosed in both the Heard et al. patent and the Berry patent require calculations based on the sine and cosine of a scan line in order to generate the memory address for each digital word being supplied by the A/D converters and since the resulting memory addresses do not correspond to a predetermined mathematical series, conventional counting techniques commonly utilized in memory addressing operations cannot be employed. Although the special calculation of a y coordinate or row memory address is not required in the apparatus disclosed by Nevin, it is still necessary to utilize the sine of the angular coordinate of each scan line and generate an appropriate x or column address for each digital word supplied by the A/D converter in order to complete the polar-to-Cartesian format conversion as data is entered into the RAM.

The addressing requirements of the above-referenced patents not only mean that the digital scan converters of the references must include an arithmetic processor or other rather complex computational logic arrangement, but each computation requires a discrete amount of time. In particular, it is usually desired or necessary to display the imaged portion of the surveillance region in real time (i.e., as the surveillance system provides current input data) and with the loss of little or no signal information. In this regard, since a television system operates at a relatively fast scanning rate, little time is available for processing the signals supplied by the surveillance system and, although buffering of the data supplied to the RAM and data read from the RAM is useful in processing the necessary digital information in the time available, the need to perform polar to rectangular address calculations can impose severe design constraints. Thus, when a large amount of digital information is to be processed, one implementing the digital scan converters of the references would seem to be faced with a choice of either increasing the capability and complexity of the memory buffering stages or sacrificing the quality of the displayed image. That is, under many circumstances it would appear that a tradeoff must be made in implementing the apparatus of the references as between increasing the structural complexity of the digital scan converter and possibly sacrificing the loss of some image information.

Accordingly, it is an object of this invention to provide an improved digital scan converter for use with apparatus such as sector scanning surveillance systems wherein image signal information is provided that is compatible with a display device operating in a Cartesian coordinate format.

It is another object of this invention to provide a digital scan converter which processes analog signals representing information relative to a polar coordinate format and supplied at a particular rate to form signals having the same information content for use with a display device that is based on a Cartesian coordinate format and operates at a rate that is independent of the rate at which analog signals are supplied to the digital scan converter.

It is a further object of this invention to provide a digital scan converter for use in displaying the sectorial surveillance region of a sector scanning surveillance system with conventional television apparatus wherein the digital scan converter operates on a real time basis to supply an image of the region presently being scanned by the surveillance system.

Still further, it is an object of this invention to provide a digital scan converter wherein the scan converter memory requirements are minimized relative to the amount of surveillance information being handled.

Further yet it is an object of this invention to provide a digital scan converter, which not only meets the above-stated objects, but is of minimal structural complexity and hence relatively economical to fabricate.

SUMMARY OF THE INVENTION

These and other objects are achieved in accordance with this invention by a digital scan converter wherein the analog return signals supplied by a sector scanning surveillance system or other source are digitized by an A/D converter at a rate determined by the surveillance system and the desired resolution of the displayed image so that the return signal associated with each scan line results in a sequence of digital words that represent signal reflections occurring from a plurality of equally spaced apart positions along that particular scan line. The digital signals supplied by the A/D converter are coupled to a RAM via an input buffer memory which provides serial-to-parallel data conversion and permits digital words to be accumulated for subsequent storage whenever the RAM is not available for writing in input data. In this regard, and in accordance with this invention, information is rapidly read from the RAM into an output buffer memory during short time intervals determined by the display device being employed and the RAM is available for the insertion of input data at all other times. For example, in the disclosed embodiment of the invention data is read from both the RAM and the output buffer memory in accordance with conventional television sync signals. In particular, stored data that corresponds to the video information to be displayed during the next horizontal sweep of the television electron beam is transferred from the RAM to the output buffer memory during each retrace interval of the horizontal sync signal. The information within the output buffer memory is then accessed during the horizontal sweep period of the television display and the RAM is simultaneously able to accept data from the input buffer memory until the next horizontal retrace interval.

In accordance with this invention a first portion of the conversion from the polar coordinate format of the surveillance system to the Cartesian coordinate format utilized by conventional display devices such as a television receiver is effected by the manner in which the A/D converter is operated to supply digital input data and the remaining portion of such format conversion is effected by the manner in which data is read from the output buffer memory and supplied to a D/A converter. In particular, in accordance with the disclosed embodiment of the invention, the angular coordinate axis of the polar coordinate system which describes the surveillance region to be displayed bisects the total scan angle of the surveillance system and is parallel to the y ais of the Cartesian coordinate system associated with a display device such as the screen of a television receiver. With this orientation between the polar and Cartesian coordinate systems, any line y=j, where j is a constant (corresponding to a horizontal line on the face of the display) will intersect each scan line a radial distance $r = j/\cos\theta$ from the origin of the polar coordinate system, where $\theta$ is the azimuthal angle of the scan line of interest. In accordance with this invention, the above-mentioned first portion of the polar-to-Cartesian format conversion is effected by supplying the A/D converter and the input buffer memory with a clock signal having a pulse repetition rate proportional to the cosine of the azimuthal angle which describes the scan line which is associated with the return signal being supplied to the A/D converter. Thus, the set of successive digital words supplied by the A/D converter in digitizing the return signal of each scan line represents signal reflection occurring at locations along a particular scan line with such locations being equally spaced apart relative to the y direction of the Cartesian coordinate display format. In the practice of this invention and relative to the displayed image, the separation between each of these parallel, horizontal traces corresponds to the y coordinate distance between incremental display areas of the display device. For example, in the disclosed arrangement for providing a television compatible signal, the spacing corresponds to the distance between adjacent horizontal sweep lines of the interlaced television display and, relative to the surveillance system, corresponds to a predetermined spatial distance. Each set of digital words (i.e., the digitized information representing the return signal of each scan line) is then transferred from the input buffer memory to the RAM by conventional addressing techniques which, in effect, partition the storage locations of the RAM into a rectangular memory array wherein the digital information derived from the first scan line of the surveillance pattern forms a first column of stored information and the set of digital words derived from the return signal of the next scan line is loaded into the nextmost available column of the memory array. Thus, if the surveillance system includes n scan lines and the image is to utilize m lines of the television screen or other Cartesian format display device, the RAM will include n columns of data wherein each of the m rows of the memory array contain the information displayed on one line of the display unit, e.g., during one horizontal sweep of a television system.

In addition to controlling the A/D converter at a rate proportional to the cosine of the azimuthal angle of each scan line, the time at which the first clock pulse reaches the A/D converter and the number of clock pulses that are coupled to the A/D converter during the processing of a single return signal is controlled in a manner which determines the shape of the upper and lower boundary edges of the imaged region and the portion of the surveillance region to be displayed. More specifically, in accordance with this invention, the upper boundary of the displayed image region is a straight horizontal line that intersects the angular coordinate axis of the polar coordinate system associated with the surveillance system a preselected distance from the origin of the polar coordinate system. Although this eliminates a selected near field portion of the surveillance region from the display, it is necessary because of the hereinafter described techniques and apparatus utilized to implement the remaining portion of the conversion between polar and Cartesian formats. Further, such a practice is commonly employed relative to sector scanning radar systems and, relative to surveillance systems such as a diagnostic ultrasonic scanner in which the present invention is embodied, the eliminated area can be established so that no detrimental loss of information occurs.

To cause the A/D converter to begin processing each return signal so that the first digital word supplied thereby represents an incremental spatial region or point on the above-mentioned horizontal upper boundary of the displayed image, the disclosed embodiment of the invention utilizes a controlled frequency signal source such as a voltage controlled oscillator (VCO) and control logic which varies the pulse repetition rate of the VCO in the above-described manner and selectively couples the VCO signal to the control terminal of the A/D converter. In this regard, the input timing control unit includes means for enabling the VCO when the surveillance system initiates an energy pulse along one of the scan lines and a counter circuit and associated logic circuitry for coupling the VCO signal to the A/D converter after a predetermined number of VCO output pulses have occurred. Since the VCO is operated at a pulse repetition rate proportional to the cosine of the angular coordinate of the scan line of interest, a first pulse is supplied to the A/D converter at a time which results in the above-mentioned straight line upper boundary of the displayed image region.

The shape of the lower boundary of the displayed image region can be determined in one of two manners. First, the lower boundary of the displayed image can be formed as an arcuate line having a radius that corresponds to a selected radial distance relative to the polar coordinate system associated with the surveillance system by terminating the VCO signal a predetermined time after the surveillance system energy pulse. In particular, relative to the disclosed embodiment of the invention, the input timing control unit includes a counter circuit that is clocked by a constant frequency reference source and supplies a signal that disables a gate circuit which couples the VCO signal to the A/D converter. In this arrangement, the time interval between the first and last VCO signal pulses delivered to the A/D converter is established so that the A/D converter supplies m digital words for a scan line that lies on or extremely near the angular coordinate axis of the surveillance system polar coordinate system. Thus, fewer than m digital words are stored in the RAM for scan lines angularly displaced from the angular coordinate axis and when data is read out of the RAM in the above-mentioned row-by-row fashion, the image display exhibits the desired arcuate lower boundary.

On the other hand, depending on the manner in which the surveillance system utilizing the invention operates, it may be possible to establish the shape of the lower boundary of the image display as a straight horizontal line so that the displayed image corresponds to a truncated isosceles triangle. When this is both possible and desired, a constant number (i.e., m) digital words are produced by the A/D converter for each of the return signals so that each storage column of the RAM contains an equal number of digitized data samples. This modification of the present invention can be implemented by using a counter circuit which counts the number of VCO signal pulses coupled to the A/D converter during the processing of each return signal and disabling the above-mentioned gate circuit when m signal pulses have been supplied. As shall be recognized upon understanding the hereinafter described manner in which the stored information is clocked out of the output buffer memory, storing m digitized signals in each column of the RAM memory matrix will cause the displayed image to have the above-described horizontal lower boundary.

As previously noted, the final portion of the polar-to-Cartesian format conversion of this invention is effected by controlling the manner in which data is read from the output buffer memory and supplied to a D/A converter. In particular and regardless of whether the scan converters configured for establishing the lower boundary of the displayed image as an arc or as a horizontal line, at least the upper rows of the rectangular storage array formed by the RAM each include n data entries corresponding to each of the n scan lines of the surveillance system. To restore proper polar perspective to each row of data being read from the output buffer memory this invention is configured for reading a particular row of information at a rate that is inversely proportional to the y coordinate of the corresponding horizontal line being produced in the displayed image. That is, in accordance with the invention, the uppermost row of information that is stored in the rectangular memory array of the RAM is read from the output buffer memory at a much faster rate than the last row of information. Additionally and as previously described, the data entries within each row of stored data represent reflections from spatial locations within the sectorial surveillance region that correspond to intersections between a horizontal line of the Cartesian output format and the angularly extending scan lines. Thus, relative to the x coordinate of the Cartesian coordinate system, the data entries do not represent equally spaced apart incremental regions of the surveillance region. To eliminate distortion which would otherwise occur, the invention is further configured so that the rate at which each particular row of data is read from the output buffer memory is modulated relative to the column location of the data entry being read. In particular, the rate at which data is read from the output buffer memory not only varies row-by-row relative to the storage locations of the RAM but is varied while reading a particular row of information so that the rate first increases as successive column entries are read until the data entry being read corresponds to the angular coordinate axis of the polar coordinate system utilized in describing the surveillance region. The rate at which data is read within that row then decreases in a like manner until the last data entry is read.

The above-described manner of coupling data to the D/A converter to provide proper polar perspective further requires the first data entry of each row of stored data to be read at a time which will cause the portions of the image being formed to lie along the line corresponding to the first scan line of the surveillance system. Thus, in accordance with the invention, the first clock pulse which causes the transfer of data from the output buffer memory to the D/A converter is generated at a time that is a function of the y coordinate distance between the line being formed in the image display and the uppermost line of the image display.

To implement each of the above-described operational aspects of reading data from the output buffer memory the disclosed embodiment of the invention utilizes a second controlled frequency oscillator such as a VCO and output data control logic which is responsive to the horizontal and vertical sync signals supplied by a conventional television sync generator. In this regard, the output data control logic includes a counter that is reset by the television vertical sync signal and clocked by the horizontal sync signal to supply a signal indicating that the first line of image information is to be displayed during the next horizontal sweep. Further, to provide a signal indicating when the first data entry of the row of data being read from the output buffer memory is to be displayed, the output data control logic includes a circuit arrangement which utilizes the horizontal and vertical sync signals to ramp signals that are synchronized to the horizontal and vertical timing of the television display. These ramps are coupled to comparator circuits which supply an output signal that is delayed relative to the horizontal sync signal by an amount corresponding to an initial portion of the horizontal sweep that does not contribute to the displayed image. The signals supplied by the comparator and the counter are both coupled to an AND gate which enables the VCO so that clock pulses are then supplied for causing data to be read from the output buffer memory.

To control the VCO so that the rate at which each row of stored information is read from the output buffer memory is inversely proportional to the y coordinate of the particular horizontal line within the displayed image, the previously mentioned ramp signal that corresponds to the timing of the vertical sweep of the television receiver electron beam is coupled to the analog reference input of a D/A converter of the type which, in effect, multiplies the value of an applied digital signal by the value of the applied analog reference. The digital signal applied to this D/A converter is provided by a read only memory (ROM) that stores values which represent the previously mentioned modulation in the reading rate that is applied while each row of image information is being read. To provide an address signal to the ROM which indicates the column address of the data entry being read from the output buffer memory, the output data control logic includes a counter that is reset by the television horizontal sync signal and clocked by the VCO signal which causes data to be read from the output buffer memory.

In addition to the circuit arrangements described above, the disclosed embodiment of the invention includes a preprocessor unit that couples the return signals supplied by the surveillance system to the A/D converter and provides low pass filtering and other appropriate analog signal conditioning. Further, in the disclosed embodiment of the invention, a postprocessor unit is included between the output buffer memory and the D/A converter. This postprocessor includes a digital circuit arrangement for, in effect, increasing the number of digital signals formed from each row of data read from the output buffer memory by a factor of 2. In this regard, the disclosed postprocessor determines the value of each successive pair of digital words supplied by the output buffer memory and, during the time interval that separates the digital words, supplies an additional digital word corresponding to one-half the sum thereof. This interpolation technique provides a more gradual transition in intensity between adjacent regions of the imaged display to thereby increase image quality without decreasing system accuracy and resolution.

BRIEF DESCRIPTION OF THE DRAWINGS

Other objects and advantages of the present invention will become apparent to one skilled in the art after reading the following description taken together with the accompanying drawings in which:

FIG. 7 schematically illustrates a circuit arrangement that can be utilized as the vertical VCO control logic unit of FIG. 1;

FIG. 9 schematically illustrates a circuit arrangement that can be employed as the horizontal VCO control logic of FIG. 1;

FIGS. 10a, 10b, 11a and 11b depict signals associated with the operation of the circuit depicted in FIG. 9.

DETAILED DESCRIPTION

Figure 1:
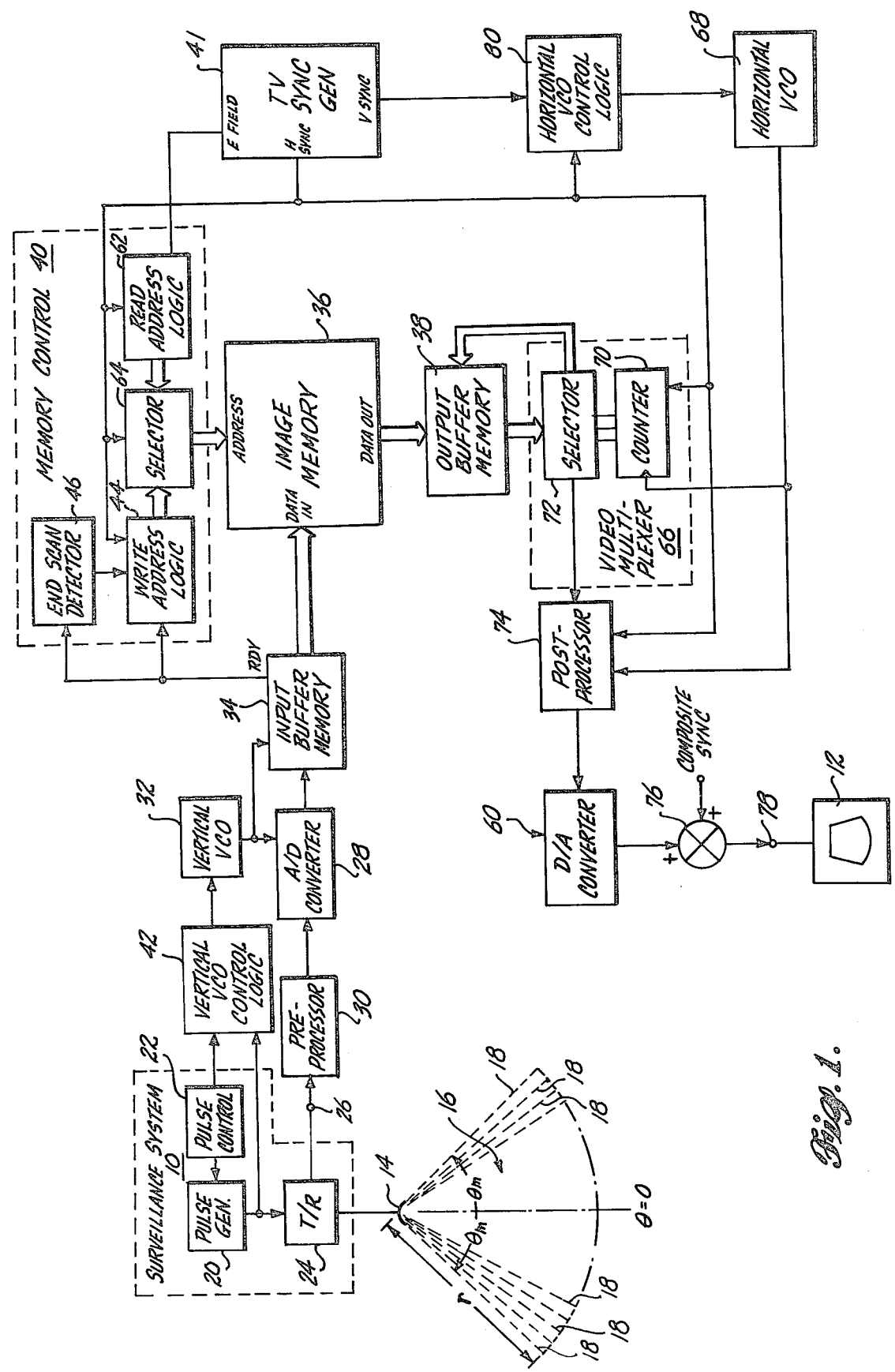
FIG. 1 is a block diagram depicting a sector scan surveillance system and a digital scan converter in accordance with this invention.

FIG. 1 is a block diagram of a digital scan converter configured in accordance with this invention for converting signals supplied by a conventional pulse-echo surveillance system 10 in a polar coordinate format into an analog signal that is compatible with various conventional display and recording apparatus which are scanned or operated according to a format that is based on a Cartesian coordinate system, such apparatus being indicated in FIG. 1 by a conventional television receiver 12. As is indicated in FIG. 1, pulse-echo systems 10 which can employ the present invention generally include a transducer 14 which periodically emits an energy pulse of relatively short time duration that propagates outwardly along a well-defined, narrow path and, after emitting each such pulse, receives return or echo signals that occur when an emitted energy pulse is scattered by reflective structure that lies within the propagation path. To encompass a two-dimensional surveillance region 16 that substantially corresponds to a sector of a circle, such systems include various means for mechanically or electronically altering the propagation direction of the emitted energy so that, in effect, energy pulses are sequentially emitted along radially directed paths denoted herein as scan lines 18 that are angularly displaced from one another. Thus, as diagrammatically depicted in FIG. 1, the surveillance field 16 can be considered as comprising a plurality of scan lines 18 which collectively form a sectorial surveillance pattern that is centered about a reference vector, $\theta=0$, wherein the angle of inclusion of the sectorial surveillance pattern is equal to $2\theta_m$, where $\theta_m$ denotes the maximum angular displacement supplied by the transducer 14. Since an echo signal, commonly referred to as a video return signal, is received for each angular position of the emitted energy (i.e., each scan line 18), a sequence of video return signals is received as the surveillance system 10 sequentially steps through the angle $2\theta$. Since each video return signal is indicative of reflective structure lying along the associated scan line 18, the sequence of video return signals can be processed to produce a two-dimensional image of reflective objects lying within the surveillance region 16. In particular, each scan line 18 is oriented at a particular angle $\theta$ and the time that elapses between the emission of a pulse of energy and any particular portion of the associated video return signal is directly proportional to the radial distance between transducer 14 and the incremental radial portion of the scan line 18 causing that portion of the video return signal. Thus, such a surveillance system is capable of supplying surveillance or imaging information in a polar coordinate format wherein $\theta$ denotes the angular or azimuthal coordinate of a small spatial element or point within the imaged region relative to a reference vector extending through the transducer 14 and r denotes the radial distance between the transducer 14 and the image element.

It will be recognized by those skilled in the art that the above described surveillance techniques are utilized in a variety of conventional radar systems which employ pulsed electromagnetic energy that is emitted into the atmosphere by an antenna which is mechanically rotated through a desired scanning angle, or is electrically scanned by conventional techniques such as those utilized with phased antenna arrays. Further, it will be recognized by those skilled in the art that identical techniques are employed with various other types of energy. For example, as shall be described in more detail hereinafter, the digital scan converter of this invention is presently embodied in an ultrasonic imaging system wherein short bursts of high frequency sound energy are sequentially emitted along a series of radially extending scan lines to provide real time video images of human cardiac, abdominal and peripheral vascular structure that are of substantial diagnostic value.

Regardless of the particular type of surveillance system employed, those skilled in the art will recognize that such a surveillance system basically includes a pulse generator 20 which periodically supplies a pulse signal in response to a trigger signal that is supplied by a pulse control network 22. Each signal pulse supplied by pulse generator 20 is coupled to transducer 14 via a conventional transmit-receive (T/R) switch 24 which is operated by pulse control network 22, or other circuit means within the surveillance system 10, so as to supply transducer 14 with a suitable energy pulse as transducer 14 is electronically or mechanically actuated to align the resulting pulse of emitted energy with one of the scan lines 18. As an energy pulse is emitted by transducer 14, T/R switch 24 is operated to couple the associated video return signal to a video signal port denoted by the terminal 26 in FIG. 1.

As is depicted in FIG. 1, in the digital scan converter of this invention the video return signals are coupled to a conventional analog-to-digital (A/D) converter circuit 28 via a preprocessor unit 30 which includes conventional circuitry for analog signal conditioning. Such circuitry includes, for example, conventional low pass filter arrangements for supplying a signal substantially representative of the "envelope" of each video return signal and DC restoration networks which reference the low pass filtered signals to a desired reference potential. Further, depending on the particular system in which the invention is embodied, various other conventional circuit arrangements may be included within preprocessor unit 30. For example, in the previously mentioned embodiment of the invention as a scan converter within a diagnostic ultrasonic imaging system, preprocessor unit 30 also includes a conventional peak detector circuit which supplies a signal representative of the peak value of each video return signal for establishing the reference voltage that is applied to a resistive ladder network of the A/D converter 28 to thereby establish the quantizing levels of the A/D converter in accordance with the amplitude of each video return signal group. Such a technique is especially advantageous in ultrasonic imaging in that, because substantial attenuation of the ultrasonic signal pulses occur as the pulses propagate through an object such as the human body, video return signals originating from structure at substantial depths are much weaker than those originating near the surface of the body and compensation for such attenuation is desired to attain an optimal display.

In accordance with this invention, A/D converter 28 can be one of the many conventional circuit arrangements which, in effect, sample an applied analog input signal at a rate determined by an applied clock signal to provide a digitally encoded output signal representative of the value of the applied analog signal when each clock pulse is supplied thereto. One type of A/D converter that is commonly referred to as a "flash-converter" operates in such a manner and is utilized in the previously mentioned embodiment of the invention to supply three-bit digitally encoded signals (digital words) on the basis of eight quantizing levels that are established by a resistive divider network which can be arranged to provide either linear or logarithmic conversion.

Continuing with the description of the basic arrangement of FIG. 1, the digitally encoded signals supplied by A/D converter 28 are coupled to an input buffer memory 34 with both A/D converter 28 and input buffer memory 34 being clocked by a "vertical" voltage controlled oscillator (VCO) 32. As shall become apparent upon considering the hereinafter described manner in which polar-to-Cartesian format conversion is effected by the invention, the term "vertical" VCO is utilized herein because VCO 32 controls the sampling rate of A/D converter 28 so that the set of digital words which is produced in response to a video return signal represents points or incremental regions within surveillance region 16 that correspond to a set of points or incremental regions within the resulting Cartesian format display which are equally spaced apart from one another relative to one of the coordinate axes, e.g., equally spaced apart in the vertical display direction. As is further indicated in FIG. 1, input buffer memory 34 supplies the digitally encoded signals to an image memory 36 with the memory capacity of image memory 36 being sufficient to store the data associated with one complete scanning sequence of the surveillance system 10. Further, input buffer memory 34 is arranged to, in effect, allow the digitally encoded signals to accumulate during time periods in which data is being read from image memory 36 for subsequent processing to form an analog signal suitable for driving television receiver 12 or other comparable Cartesian format display or recording apparatus. In this regard, image memory 36 is a conventional random access memory (RAM) that includes a single set of address lines and, hence, cannot simultaneously store input data while supplying previously stored data. Thus, as shall be described in more detail hereinafter, the present invention is arranged for reading data from image memory 36 and into an output buffer memory 38 during a period of time that corresponds to the relatively short retrace interval which occurs after the electron beam of the television receiver 12 has been horizontally swept across the face of a television screen and image memory 36 is made available for storing data supplied by input buffer memory 34 during all other portions of the television scanning sequence. Thus, it can be recognized that input buffer memory 34 temporarily stores the digitally encoded signals to thereby permit the digital scan converter of this invention to accept video return signals at the rate at which they are made available by surveillance system 10 while simultaneously permitting data to be read from image memory 36 at a different rate such as the rate utilized in conventional television scanning techniques.

To structure the invention such that no data is lost during time intervals in which image memory 36 is accessed to supply previously stored scanning data, input buffer memory 34 provides a storage capacity that is commensurate with the scanning rate of the surveillance system in which the invention is embodied and, in order to permit rapid removal of accumulated data during periods of time in which data can be written into image memory 36, is preferably configured for simultaneously supplying image memory 36 with more than one digitally encoded signal (digital word). Such buffer memories include, for example, conventional arrangements wherein incoming digital words are processed through circuit arrangements for affecting serial-to-parallel conversion with the individual bits of each digital word then being clocked into an associated first in, first out, (FIFO) serial memory. For example, in the previously mentioned ultrasonic imaging system which employs a digital scan converter of this invention, the video return signal of each scan line 18 of FIG. 1 is sampled at a rate which results in 256 three-bit digitally encoded words that correspond to 256 equally spaced apart elements lying along that particular scan line. In this embodiment of the invention, each of the three FIFO memories included in the input buffer memory 34 has a capability for storing 64 four-bit digital words to thereby provide a total storage capacity of 768 bits, which is equal to the maximum amount of digital information generated by A/D converter 28 in response to a single video return signal. Further, since conventional FIFO memories provide a "ready" signal each time a digital word is available at the FIFO memory output terminals and, in this particular arrangement each of the three FIFO memories contain bits of corresponding significance within four consecutive digitally encoded signals supplied by A/D converter 28, four digital words are simultaneously made available for storage within image memory 36 each time data is shifted into the output registers of the FIFO memories.

Regardless of the exact arrangement of input buffer memory 34, the digital words supplied thereby are written into the storage locations of image memory 36 under the control of a memory control unit 40 and in response to the ready signal supplied by input buffer memory 34. In this regard and as previously mentioned, the writing or storage operation is inhibited during a period of time that corresponds to the retrace interval of the horizontal scanning sequence which sweeps an electron beam across the face of the television screen. Thus, memory control unit 40 is further responsive to a conventional horizontal sync signal that is supplied by a TV sync generator 41 which can be one of the conventional circuit arrangements that utilize a commercially available silicon integrated circuit that is driven by a conventional crystal oscillator to supply all of the timing signals necessary for the operation of a raster scan TV display. In addition, both the horizontal and vertical sync signals supplied by TV sync generator 41 are utilized within memory control unit 40 to properly address image memory 36 when data is being transferred from image memory 36 to output buffer memory 38 (i.e., during the horizontal retrace interval of the horizontal sync signal).

The block diagram representation of memory control unit 40 that is presented in FIG. 1 and conventional circuit arrangements for implementing this block diagram representation to effect the above described memory control functions and the remaining structure of FIG. 1 is best understood by examining the manner in which the invention operates to perform polar-to-Cartesian format conversion. In describing the polar-to-Cartesian format conversion reference will now be made to FIG. 2, which provides a more detailed representation of the surveillance region 16 of FIG. 1 with reference to a Cartesian coordinate system wherein the origin of the polar coordinate oriented scanning pattern 16 is located at a point ($x_0$, $y_0$) in Cartesian space and the angular coordinate axis 19 coincides with a line having a constant x coordinate ($x_0$). With reference to the Cartesian and polar coordinate systems established in FIG. 2 and as described in in more detail hereinafter, the digital scan converter of this invention is configured to display the portion of the depicted sectorial surveillance region 16 that is bounded in the near field region by a line having a preselected constant y coordinate $y_a$, where $y_a$ is a predetermined value. For example, the ultrasonic transducer of the exemplary embodiment of the invention described herein (schematically denoted as 14' in FIG. 2) is of circular cross-sectional geometry and is sequentially pulsed to produce a burst of acoustic energy along each of 128 radially extending scan lines 18 that are equally spaced apart from one another within the depicted scan angle $2\theta_m$. Since the acoustic energy passes radially outward from the curved face of the transducer 14', the value of $y_a$ and hence the upper boundary of the image display is physically constrained to be equal to or greater than $r_0$, where $r_0$ is the radius of transducer 14'. Further, it should become apparent upon understanding of the manner in which data is read from output buffer memory 38 of FIG. 1 to effect the final portion of the conversion between the polar coordinate format of the signals produced by the surveillance system and the Cartesian display format, $y_a$ is also constrained to be equal to or greater than a minimum value which relates to the time required for a television receiver to trace out the portion of $y_a$ that lies within the system scanning angle $2\theta_m$.

Figure 2:
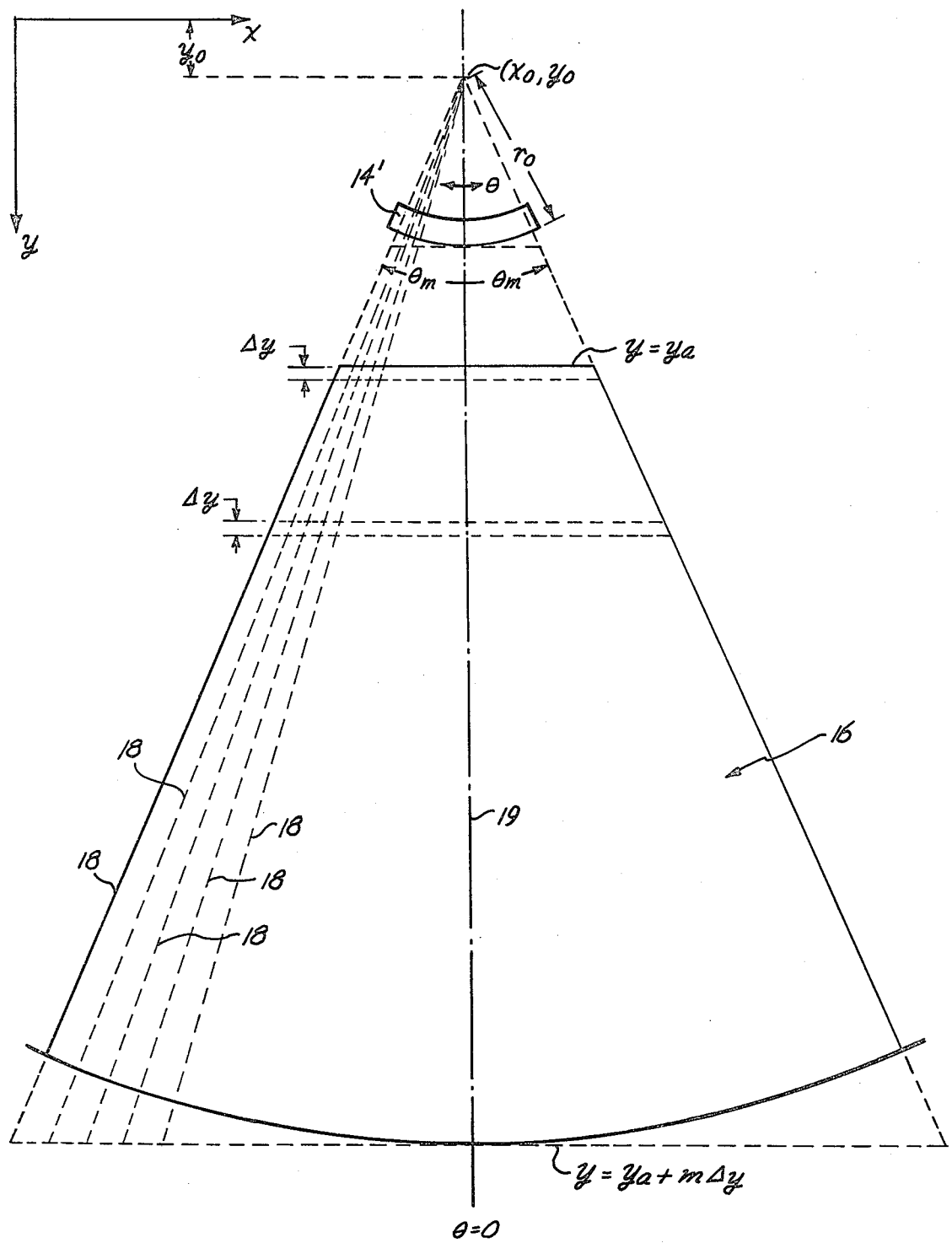
FIG. 2 is an enlarged diagrammatic representation of the surveillance region of the surveillance system of FIG. 1 that is useful in understanding operation of the invention.

With continued reference to FIG. 2, it can be recognized that any point or small incremental area of the surveillance region that lies on the angular coordinate axis 19 exhibits a y coordinate equal to the sum of $y_0$ and r, where r is the radial distance between the origin of the polar coordinate system and the particular point or incremental region of interest. Further, it can be recognized that a set of m spatial elements within the above described display region that lie on the angular coordinate axis and are spaced apart from one another by a predetermined distance $\Delta y$ exhibit y coordinate values of $y_k = y_a + (k-1)\Delta y$, where k is an indexing integer that ranges between 1 and m. Thus, the vertical VCO 32 of the arrangement depicted in FIG. 1 can be caused to activate the A/D converter 28 and input buffer memory 34 for supplying an ordered set or one-dimensional array of m digitally encoded signals which represent the reflections occurring at each of the m spatial elements lying on a scan line 18 which coincides with the angular coordinate axis 19 by: (1) establishing the frequency or sample rate of the clock signal supplied by vertical VCO 32 equal to a constant rate which corresponds to the range increment $\Delta y$ (i.e., a sample rate equal to $2v_p/\Delta y$, where $v_p$ is the propagation velocity of the emitted pulse energy within the object being examined); and (2) enabling and disabling the vertical VCO 32 so that the first and last signal samples of the video return signal are taken at times which respectively correspond to the distance $y_a$ and $y_a + m\Delta y$.

Considering now scan lines 18 that are angularly disposed from the angular coordinate axis 19 by an angle $\theta$, it can be shown that an ordered set of points or incremental regions therealong which exhibit y coordinates $y_k$, k = 1, 2, 3, ..., m identical to the y coordinates of the above defined points along angular coordinate axis 19 are located at a radial distance $y_k/\cos \theta$ from the origin of the polar coordinate system of FIG. 2. For example, consider the boundary edge at $y = y_a$ in FIG. 2. As previously noted, the incremental region lying at the intersection of the line $y = y_a$ and the angular coordinate axis 19 is located a radial distance equal to $y_a$ from the origin of the polar coordinate system whereas, as described above, the incremental region lying at the intersection of the horizontal line $y=y_a$ and any scan line 18 having an angular coordinate $\theta$ is located a radial distance from the origin of the polar coordinate system that is equal to $y_a/\cos\theta$. Since this relationship is valid for each horizontal line that can be drawn through the surveillance region depicted in FIG. 2 (i.e., $y=$any constant), it follows that the pulse repetition rate of VCO 32 in the arrangement of FIG. 1 can be controlled so that A/D converter 28, in effect, samples the video return signal associated with each scanning path 18 in a manner which produces a succession of digital words that represent reflection occurring from spatial points or incremental regions that lie on equally spaced apart, predetermined horizontal traces through the portion of the surveillance region 16 that is to be displayed in Cartesian coordinate format. In the practice of this invention these horizontal traces through the surveillance region 16 correspond to horizontal lines that are swept out in generating a television display or to the rows of display elements in various other display devices that include a rectangular matrix of display elements.

To control vertical VCO 32 in the above described manner, the arrangement of FIG. 1 includes a vertical VCO control logic unit 42, which receives signals that directly indicate or can be conveniently processed to indicate the beginning of each scanning sequence, the initiation of each pulse of energy along one of the scan lines 18 and the angular coordinate $\theta$ of the scanning path that is currently being supplied with a pulse of energy and hence providing a video return signal. Such signals are conventionally supplied by sector scan surveillance systems and are well known to those skilled in the art. Further, in the hereinafter disclosed exemplary embodiment of vertical VCO control logic 42 wherein the surveillance system scans in a known direction (e.g., counter-clockwise in FIG. 2) and a predetermined number of equal spaced apart scan lines 18 are included within the surveillance angle $2\theta$, the surveillance system need not supply the angular coordinate information since it can be attained by counting the number of video return signals (scan lines) that have been processed.

In operation, as each pulse of energy is transmitted by the surveillance system 10 of FIG. 1 and the associated video return signal is coupled to A/D converter 28, the vertical VCO control logic unit 42 of FIG. 1 couples the vertical VCO signal to a clock terminal of the A/D converter 28 at a time which corresponds to the upper boundary, $y=y_a$, of the region to be displayed and establishes the pulse repetition rate of vertical VCO 32 equal to $p_r\cos\theta$, where $p_r$ is the pulse repetition rate necessary to cause A/D converter 28 to supply m digitally encoded words (signal samples) when scan line 18 associated with the video return signal being processed coincides or nearly coincides with the angular coordinate axis 19 (i.e., when $\theta=0$). Thus, it can be noted that vertical VCO 32 operates at a constant pulse repetition rate while each video return signal is being processed by A/D converter 28 and that the pulse repetition rate of vertical VCO 32 varies from scan line to scan line as a function of cosine $\theta$. For example, if $\theta_m=45°$ in FIG. 2, to thereby produce a surveillance region and image display having a 90° angle of inclusion, the vertical VCO pulse repetition rate along the two scan lines 18 that define the radially extending boundaries of the image region will be 1.414 times slower than the vertical VCO pulse repetition rate when the video signal being processed is associated a scan line 18 having an angular coordinate value of approximately zero. This means that fewer digital words are produced for a given radial distance along scan lines 18 having a substantial $\theta$ coordinate than are produced for a like radial distance along scan lines 18 having a relatively small $\theta$ coordinate. Thus, if VCO control logic 42 is arranged to remove the vertical VCO signal from the A/D converter 28 after a predetermined time interval that corresponds to the distance or range value $y_a+m\Delta y$ along the angular coordinate axis 19 of FIG. 2, the lower boundary of the displayed image region will be the depicted arc. On the other hand, less than m digital words will be formed for angularly offset scan lines 18 and if vertical VCO 32 supplies m pulses for each radially extending scan lines 18 in FIG. 2, the lower boundary of the surveillance region 16 will not be the arc of constant range, but will be the depicted straight line $y=y_a+m\Delta y$ so that the geometry of the surveillance region 16 corresponds to a truncated isosceles triangle. In situations wherein surveillance system 10 of FIG. 1 operates such that sufficient time is available to process the video return signal produced at scanning path $\theta_m$ over a distance equal to $1/\cos\theta_m$ times the radial distance (range) along the angular coordinate axis 19 (i.e., $y=y_a+m\Delta y$), either of the two depicted scanning regions can be utilized by suitably arranging the vertical VCO control logic 42.

More specifically, if the lower boundary of the range display is to be a horizontal line, vertical VCO control logic 42 controls vertical VCO 32 so that a predetermined number of pulses are supplied to A/D converter 28 during the processing of each video return signal. For example, vertical VCO control logic 42 can include a conventional counter that is clocked by the vertical VCO signal and reset as the processing of each video return signal is complete, with the counter disabling a logic gate that couples the VCO signal to A/D converter 28 after exactly m VCO pulses have been supplied. Thus, each set of digital words supplied by A/D converter 28 will contain m digital words and, when the surveillance system 10 has completed one scanning sequence, A/D converter 28 will have supplied n ordered sets of digital words each containing m elements, where n denotes the number of scan lines 18 within the surveillance region 16. Thus, considered collectively, the information supplied by A/D converter 28 during one such scanning operation of the surveillance system 10 constitutes a two-dimensional array having m rows and n columns in which each column is representative of information gathered from vertically spaced apart along a particular scan line and each row is representative of information associated with horizontal traces through the vertically spaced apart region. On the other hand, when the present invention is embodied so that the lower boundary of the image display corresponds to the arcuate line of constant distance that is depicted in FIG. 2, vertical VCO control logic 42 operates vertical VCO 32 so that an ordered set of m digital signals are supplied by A/D converter 28 when the video return signal of a scan line lying on or near the angular coordinate axis 19 is processed and ordered sets of less than m data words are produced by A/D converter 28 when the video return signals associated with scanning paths 18 having a $\theta$ coordinate greater than 0 are being processed. For convenience, the complete collection of data words produced by A/D converter during a complete scanning cycle of the surveillance system 10 can still be considered as a m by n information array wherein column elements that correspond to locations within FIG. 2 that lie between the line $y=y_a+m\Delta y$ and the depicted arcuate boundary are arbitrarily set to a value which will not cause an image signal to be produced in the corresponding portion of the video output signal that is produced by this invention.

In the practice of this invention, image memory 36 is addressed so that it can be considered to be an m by n rectangular array of memory locations or registers. For example, in the previously mentioned ultrasonic imaging system in which the invention is practiced, wherein 128 scan lines 18 are employed that are angularly spaced apart by equal incremental angles and vertical VCO 32 is controlled to supply 256 three-bit digital words when the video signal associated with a scan line 18 having an angular coordinate equal to (or nearly) zero is processed, image memory 36 includes three 32 kilobit memory planes that respectively store one bit of each three-bit word supplied by A/D converter 28 through the previously described operation of input buffer memory 34. Thus, it can be recognized that in order to properly address image memory 36 for the storage of input data, memory control unit 40 need only contain a conventional counter arrangement for a column of storage locations within image memory 36 each time input buffer memory 34 supplies input data corresponding to a particular scan line 18 of FIG. 2 and a conventional counter arrangement for successively clocking row addressing lines of image memory 36 so that the successive bits of input data provided by buffer memory 34 are stored in successive rows of the memory array. More specifically, and with reference to FIG. 3 which diagrammatically depicts the storage array formed by one memory plane of such an image memory 36, both the column and row counters are reset to zero prior to the start of a surveillance scan so that the first set of digital words will be stored in the leftmost column of image memory 36. In this respect, as data associated with the first scan line 18 (i.e., the leftmost scanning path 18 in FIG. 2) is made available by input buffer memory 34, the row counter circuit within write address logic 44 in FIG. 1 is clocked by a timing circuit which includes a high frequency clock source and is arranged to supply a number of clock pulses identically equal to the number of data words available in the output registers of input buffer memory 34 as each ready signal is supplied. For example, with respect to the previously mentioned embodiment of the invention that utilizes an input buffer memory which simultaneously supplies four digital words, the row address counter is incremented by four after each data transfer operation. As previously mentioned, the transfer of data from input buffer memory 34 to image memory 36 can only occur when image memory 36 is not supplying information to output buffer memory 38. Thus, as is diagrammatically indicated in FIG. 1, write address logic 44 receives the horizontal sync signal supplied by TV sync generator 42 and includes suitable conventional circuitry for disabling or inhibiting the loading of data into image memory 36 during portions of the horizontal sync signal that are indicative of horizontal retrace.

Memory control unit 40 further includes a detector 46 that is responsive to the ready signal supplied by input buffer memory 34 and determines that the last digital word of each particular scanning path 18 has been coupled from input buffer memory 34 and written into image memory 36. Various logic arrangements can be utilized to perform this function. For example, one circuit that operates in embodiments in which the lower boundary of the image display is an arc and embodiments in which the lower boundary is a horizontal line comprises a counter that is reset by the ready pulse supplied by input buffer memory 34 and clocked at a known frequency by a conventional clock circuit. In this arrangement, the bit-capacity of the counter and the clock frequency are selected so that the counter will supply a carry signal that clocks the column counter after a predetermined time interval corresponding to the interval between successive scan lines 18. More specifically, because of the previously described manner in which the digital words representing a particular video return signal are supplied by A/D converter 28, the sets of digital words that represent each scan line 18 are separated from one another by a fairly substantial time interval. Thus, the time interval required to generate the above-mentioned carry signal is established so that the row counter is reset and the column counter is clocked between the last digital word of one scan line 18 and the first digital word of the next scan line is coupled to image memory 36. With memory control unit 40 operating in this manner throughout one complete scanning sequence of surveillance system 10, image memory 36 will thus contain information resulting from one complete scan of the surveillance region 16 of FIG. 2 that is to be displayed.

Although, as previously described, the rectangular memory array of image memory 36 holds the information to be displayed so that each row of memory locations in the rectangular array corresponds to one horizontal line of the desired display (e.g., one horizontal line of the 525 lines utilized in a conventional television system), further format conversion is required so that the displayed image will exhibit proper perspective relative to the x direction of the Cartesian display format and the vertical position of the upper boundary of the image region must be established relative to the upper edge of the display device. The necessary operations can basically be understood by comparing the memory array of FIG. 3 with FIG. 4 which illustrates the face of a television screen and the outline of the image region that is to be displayed and was described relative to FIG. 2.

Figure 3:
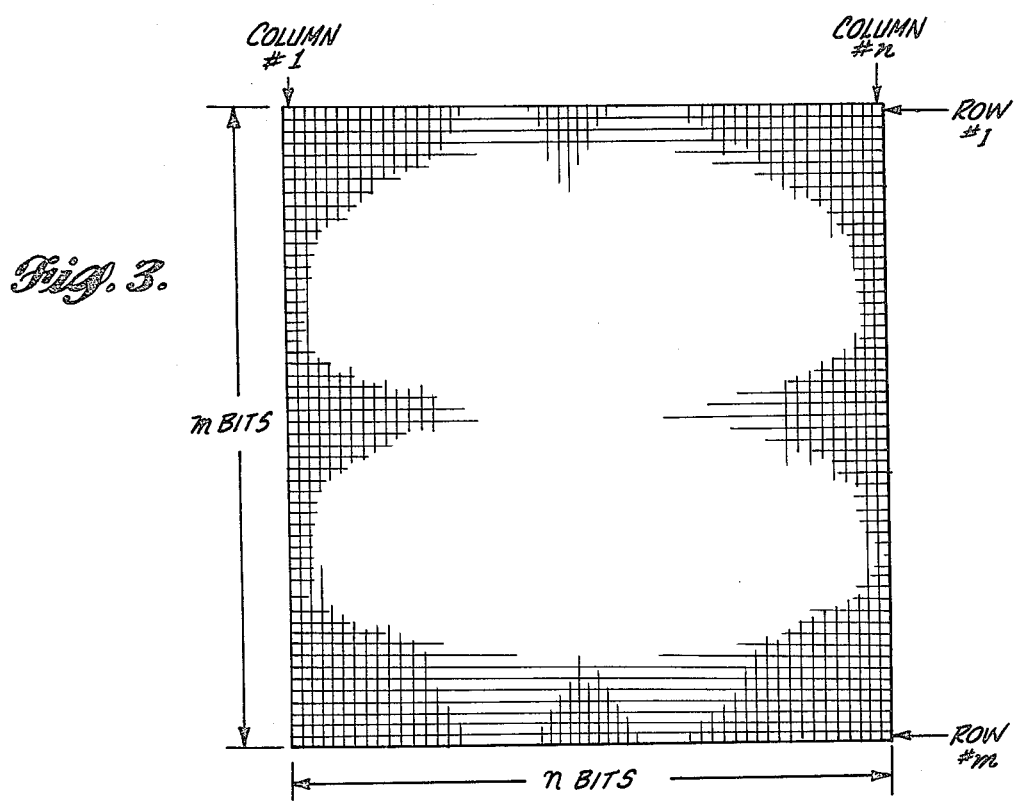
FIG. 3 diagrammatically depicts the organization of the image memory of FIG. 1 as a rectangular array of storage locations.

In FIG. 3, the television screen is denoted by the numeral 46 and the upper and left-hand edges thereof (48 and 50) respectively correspond to the x and y axes of the output coordinate system and the television electron beam is assumed to sweep from left to right in the previously described manner. Additionally, the upper boundary 52 of the displayed image region 54 is displayed on a particular horizontal sweep of the television receiver that is denoted as sweep a in FIG. 4. As previously noted, the upper boundary 52 of the displayed image 54 corresponds to the line $y=y_a$ of FIG. 2 and the first row of the rectangular memory array of FIG. 3 stores n signals that represent the reflection occurring from elemental regions that lie on the intersection of the line $y=y_a$ and each of the n scan lines of FIG. 2. Since, as previously noted, information is read into output buffer memory 38 during the retrace interval of the television sync signal, it can be recognized that the first row of the memory array of FIG. 3 must be addressed during the retrace interval of the horizontal sweep which occurs immediately prior to sweep a of FIG. 4.

Figure 4:
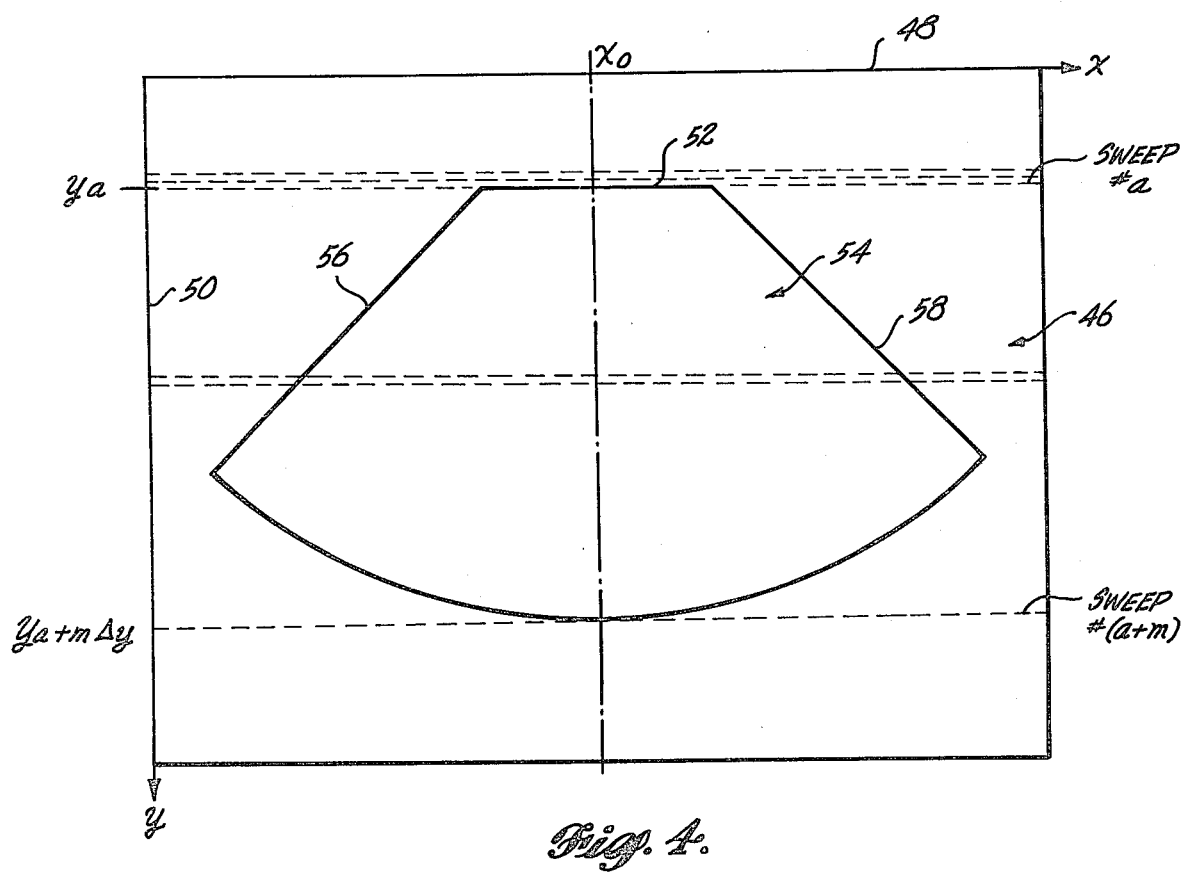
FIG. 4 illustrates the display format of the invention relative to the rectangular face of a television screen.

Two additional requirements that must be met in order for the invention to supply a signal that produces the displayed image 54 can be noted by examining FIG. 4. First, in order to achieve proper polar perspective it can be seen that the left boundary 56 of the displayed image 54 must intersect each horizontal sweep of the television screen 46 at the angle identified as $\theta_m$ in FIG. 2. Thus, each horizontal sweep of the television display that follows sweep a in FIG. 4 must be formed so that the image data read from the first column of the associated row in the memory array of FIG. 3 is positioned closer to the left-hand edge 50 of TV screen 46 than was the first image entry of the preceding horizontal sweep. Relative to the signal that is formed by this invention to produce the displayed image 54, this means that the time elapsing between the horizontal sync pulse and the initiation of image information must linearly decrease as the successive lines of image are formed on the TV screen 48.

Secondly, m words of image information are available in the memory array of FIG. 2 for forming each horizontal sweep of the television display of FIG. 4 that passes through the displayed image 54 and, to exhibit proper polar perspective, as subsequent horizontal lines of the television display are formed the m words of image information must occupy a greater portion of the horizontal sweeps of the TV display. In effect, this means that the rate at which successively lower rows of the stored information are read into the TV compatible signal supplied by the digital scan converter of FIG. 1 must vary as an inverse function of the distance between the top edge 48 of the television display in FIG. 4 and the particular television sweep being formed. As described in more detail hereinafter, this aspect of the format conversion performed by this invention is effected by controlling the rate at which data is coupled from the output buffer memory 38 to a D/A converter 60 that forms the video signal supplied by this invention. That is, each successively lower row of image information in the memory array of FIG. 3 is read from the output buffer memory 38 at a slower rate than the preceding row of image information.

Although varying the rate at which the stored image information is supplied to D/A converter 60 on a row-by-row basis will cause proper orientation of the left and right boundaries 56 and 58 of the displayed image 54, proper polar perspective will not be attained unless the rate at which image information is supplied is modified as a particular row of information is coupled to the D/A converter 60. In this respect and with reference to FIG. 5, consider the electron beam of a television receiver that is travelling at a constant speed from left to right to form the upper edge 52 ($y = y_a$) of the displayed image 54. Relative to the horizontal or x direction, the image information contained as column elements in the row of the memory array of FIG. 2 that is utilized to form the upper edge 52 represents an incremental spatial element of the surveillance region having a corresponding length $\Delta x$ that was not affected by that portion of the format conversion process achieved as information was placed in memory. In particular, as can be seen by the polar coordinate scan lines that are superimposed on the image line 52 in FIG. 5, the polar coordinate format of the input data dictates that image information displayed nearest the boundary edges 56 and 58 of the displayed image 54 must occupy a larger portion of the television sweep signal than image information that lies near the center of the display ($\theta = 0$). Utilizing the goemetry involved and appropriate trigonometric relationships, it can be shown that the length $\Delta x_1$ that should be occupied by the image information adjacent to the $\theta = 0$ reference can be expressed as $y_a \tan \Delta\theta$, whereas the length $\Delta x_2$ that should be occupied by visual information representing the previous column of the memory array can be represented as $y(\tan 2\Delta\theta - \tan \Delta\theta)$. This relationship holds for all angles $\theta$ and, it can be shown that the rate at which image information is supplied to D/A converter 60 must be modulated by the factor $(1 + \tan \theta)$ in order to prevent distortion within the displayed image.

Referring again to FIG. 1, the above-described operations necessary to utilize the information stored in the memory array of FIG. 3 to provide the image display of FIG. 4 are effected by the manner in which data is transferred from image memory 36 to output buffer memory 38 and by the manner in which data is serially clocked from output buffer memory 38 to D/A converter 60. First, to supply one row of stored image information to output buffer memory 38, image memory 36 is addressed by a portion of memory control unit 40 that is denoted in FIG. 1 as read address logic 62. As is schematically depicted in FIG. 1 memory control unit 40 also includes a conventional selector 64 or other well-known means that can be driven from the television horizontal sync signal to interconnect the read address logic 62 with image memory 36 during the retrace periods and interconnect the write address logic 44 with image memory 36 at all other lines. To supply image memory 36 with the proper row address, read address logic 62 includes a counter that is clocked by the horizontal sync signal supplied by TV sync generator 41. The interlaced scanning pattern of a conventional television receiver can be accommodated by connecting the least significant address line of image memory 36 for receiving the "even-field" signal that is supplied by conventional television sync generators such as TV sync generator 41. The odd numbered rows of image information will then be read from image memory 36 during the first half of the television frame interval and the even numbered rows will be read during the second half.

To cause the first row of stored image information to be coupled to output buffer memory 38 so that the upper boundary 52 of the image display described relative to FIG. 4 will exhibit the desired placement relative to the upper edge 48 of the television screen, the row address counter of read logic 62 is reset by a signal which indicates that image display should begin. For example, in the embodiment of the invention that is disclosed in more detail hereinafter, the row address counter is reset by a counter which counts the number of horizontal sync signals supplied during one frame of the television display and generates a signal for resetting the row address counter when a predetermined number of sweeps have been completed, i.e., as the electron beam completes the horizontal sweep immediately prior to sweep a of FIG. 4.

To provide the necessary column addresses during the reading of each row of stored image information, read address logic 62 also includes a column counter that is clocked at a rapid rate and reset by each horizontal sync pulse. In this respect, in order to load output buffer memory 38 within an 8 microsecond retrace interval, image memory 36 and output buffer memory 38 are arranged in a conventional manner that allows a single clock pulse to transfer more than one bit of digital information. For example, in the previously mentioned embodiment of this invention wherein image memory 36 includes three memory planes each having a 32 kilobit storage capability, each memory plane includes eight 1k by 4 memory chips so that 8 bits of information can be accessed by a single address. Thus, in order to transfer the 128 words of image information that are stored in image memory 36 the column counter of the read address logic of this particular embodiment of the invention need only supply sixteen column addresses.

After the completion of a retrace interval in which data is being written into output buffer memory 38, imaging memory 36 accepts new image information while data is simultaneously being transferred from output buffer memory 38 to D/A converter 60. In this regard, in the arrangement of FIG. 1 data is clocked from the output buffer memory 38 by a video multiplexer 66 by signal pulses that are provided by a horizontal voltage controlled oscillator (VCO) 68. As is illustrated in the arrangement of FIG. 1, the video multiplexer 66 includes a counter 70 that is reset at the beginning of each sequence in which data is transferred to D/A converter 60 by the horizontal television sync signal and is clocked by the previously mentioned pulses supplied by the horizontal VCO 68. Video multiplexer 66 further includes a selector circuit 72 that utilizes the count provided by counter 70 to access the image information of output buffer memory 38 and couple a digital word representing one incremental image region to the D/A converter 60 for each pulse supplied by horizontal VCO 68. For example, in the previously mentioned embodiment of the invention employing three-bit digital encoding of the stored image information, the output buffer memory 38 comprises a pair of 16 by 4 RAMS for each of the memory planes of image memory 36. Because of the previously described topology of this embodiment, each pair of the output buffer memory RAMS store 128 bits that correspond to bits of like significance within each of the 128 digital words of image information. Since such an arrangement of the output buffer memory 38, in effect, forms a 16 by 8 storage array, the selector 72 of FIG. 1 selects one of the eight lines of this array in accordance with the three least significant bits of the count stored within counter 70 and the group of counter outputs that make up the next four bits of the count contained within counter 70 are utilized to supply a row address that accesses the necessary column of this array.

Regardless of the exact arrangement utilized, video multiplexer 66 thus supplies a digitally encoded signal having the same number of bits as was supplied by A/D converter when image information is written into image memory 36. As is indicated in FIG. 1 by the postprocessor unit 74 digital signal conditioning can be utilized as the digital information is coupled from the video multiplexer 66 to D/A converter 60. In this respect, a postprocessor 74 that has been utilized in the practice of this invention to determine the value of each successive pair of digital words supplied by the video multiplexer 66 and add a digital word corresponding to one-half the sum thereof between such successive digital words will be described relative to FIG. 12.

Regardless of whether or not a preprocessor 74 is necessary or desired, D/A converter 60 is a conventional arrangement which adds the pulses of each incoming digital word so that the sum thereof results in an equivalent analog signal level. In this respect, D/A converter 60 preferably employs a resistive network of the weighted divider type which provides a gamma corrected signal that is compatible with conventional television systems. A composite television sync signal, provided by the TV sync generator 41, is then added to the signal supplied by the D/A converter 60 within a summing network 76. Thus, the signal supplied by summing network 76 to an output terminal 78 is fully compatible with conventional television systems and when displayed on the television receiver 12 of FIG. 1 results in a real time image of the desired portion of the surveillance field 16.

Figure 5:
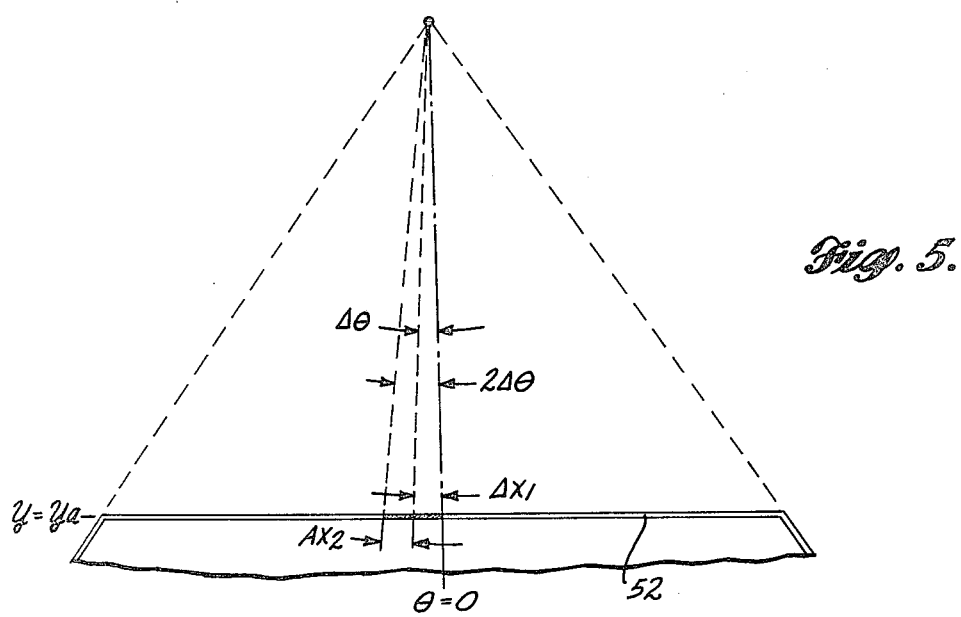
FIG. 5 is an enlarged, more detailed view of the upper boundary of the image display of FIG. 4 which depicts geometrical considerations that are useful in understanding the invention.

As was indicated relative to FIGS. 4 and 5, formation of the displayed image with the proper orientation and polar perspective requires that horizontal VCO 68 begins supplying signal pulses to the video multiplexor 66 at a predetermined time after each horizontal sync signal has been supplied by TV sync generator 41 and requires that the pulse repetition rate of the VCO signal be not only varied on the basis of the number of sweeps that have occurred, but be modulated during each horizontal sweep interval. Thus, as is schematically indicated in FIG. 1 a VCO control logic unit 80 receives the horizontal and vertical sync signal supplied by the TV sync generator 41 to enable and disable horizontal VCO 68 at the appropriate times and control the pulse repetition rate of horizontal VCO 68. Based on the previous description of the required operation of horizontal VCO 68, various arrangements that can be used as VCO control logic 80 will become readily apparent to one of ordinary skill in the art. Further, an exemplary embodiment thereof configured for use with the previously mentioned ultrasonic imaging system that utilizes the invention is described in more detail relative to FIG. 9.

Having hereinbefore described the basic arrangement of a digital scan converter configured in accordance with this invention, exemplary embodiments of the elements denoted as vertical VCO control logic 42, horizontal VCO control logic 80 and video postprocessor 74 will now be described. In this respect, the hereinafter disclosed arrangements of each of these circuits relate to the previously mentioned diagnostic ultrasonic scanning system which employs 128 angularly spaced apart scan lines wherein 256 digitized signal samples are taken along the centermost scan lines and a video signal is produced that will cause a television receiver to display the image in the format described relative to FIG. 4.

As noted, relative to FIG. 2, the ultrasonic scanning system in which the invention is presently embodied utilizes a transducer (14' in FIG. 2) of circular cross section wherein pulses of ultrasonic energy are sequentially emitted for passage through the curved face of the transducer and propagation along each of the 128 scan lines. Unless compensating measures are taken, such a configuration can result in distortion of the displayed image when such an ultrasonic scanning system is utilized to image a region that is very near the face of the transducer. In particular, and with reference to FIG. 6, when the horizontal line $y=y_a'$ which corresponds to the upper boundary of the image to be displayed (denoted as upper boundary 52 in FIG. 4) is very near or tangential to the transducer, those energy pulses that pass along scan lines near the $\theta=0$ axis reach the portion of the object being scanned that corresponds with the line $y=y_a'$ in less time than do those energy pulses that pass along scan lines having a more substantial angular coordinate $\theta$. In this regard, when the transducer 14' exhibits a radius of $r_a$, it can be shown from the geometric relationships involved that the radial distance from the face of the transducer 14' to the line $y_a'$ is equal to $(r_a/\cos \theta) - r_a$. Since the first clock pulse that is to be coupled to the A/D converter (28 of FIG. 1) must be supplied by vertical VCO 32 coincident with the time at which the video return signal represents reflections occurring at the intersection of that particular scan line and the line $y = y_a'$ and since the initiation of the emitted pulse is utilized to control this timing, it can be recognized that undistorted during shallow or near field scanning requires control of the vertical VCO 32 in addition to the control previously described relative to situations in which the upper boundary of the displayed portion of the imaged region is substantially spaced apart from the face of the transducer 14'. That is, in the situation being described, not only must the pulse repetition rate of the vertical VCO 32 be controlled as a function of the cosine of the angular coordinate of the scan line associated with the video return signal being processed, but the manner in which the vertical VCO 32 operates should also be controlled as a function of the angular coordinate of the associated scan line to provide geometric correction that ensures that the first digital word produced by the A/D converter 28 exactly corresponds to the distance $y_a'/\cos \theta$.

FIG. 7 illustrates a circuit arrangement that can be utilized as the vertical VCO control logic 42 of FIG. 1 to provide the control functions described relative to the basic embodiment of the invention while simultaneously ensuring that image distortion does not occur when the upper boundary of the imaged region is at or near the surface of the transducer 14'. In the arrangement of FIG. 7, the pulse repetition rate of vertical VCO 32 is established in accordance with the cosine of the scan angle of the video return signal being supplied to A/D converter 28 of FIG. 1 by a logic arrangement denoted in FIG. 7 as PRR control 90; the vertical VCO 32 is enabled or energized at a point in time which corresponds to the time at which the video return signal represents reflections occurring at a point on the line $y = y_a'$ of FIG. 6 by a flip flop 92 and associated counter circuit 94; and the vertical VCO output signal is supplied to the A/D converter of FIG. 1 via a three input AND gate 96 which is connected to receive the signal supplied by vertical VCO 32, a VCO enable signal that is supplied by a circuit arrangement denoted as preimage counter 98 and a VCO stop signal that is supplied by an arrangement denoted as end image counter 100. As shall be described in more detail hereinafter, preimage counter 98 enables the AND gate 96 at a time that corresponds to the time at which the video return signal represents reflections occurring from a point on the upper boundary of the region to be imaged and end image counter 100 supplies a signal that inhibits AND gate 96 after an appropriate number of vertical VCO signal pulses have been coupled to the A/D converter.

With more specific reference to FIG. 7, the signal that initiates each pulse of surveillance energy (referred to hereinafter as the EPRF signal) is coupled to the D input of a type D flip flop having the clock input thereof connected for receiving a high frequency clock signal denoted as CLK A in FIG. 7. Since the EPRF signal includes a rectangular pulse that occurs as each pulse of surveillance energy is being generated, the Q output of flip flop 102 supplies a single rectangular signal pulse that is synchronized to the CLK A signal each time the surveillance system transmits a pulse of energy along one of the 128 equally spaced apart, angularly oriented scan lines 18. As can be seen in FIG. 7, the Q output terminal of flip flop 102 is coupled to the clock terminal of a scan line counter 104 via an inverter circuit 106 and is connected for loading counters and resetting flip flops of the depicted circuit, e.g., flip flop 92, counter 94, a counter and flip flop within preimage counter 98 and a counter and flip flop within end image counter 100. With this arrangement, the circuit of FIG. 7 is initialized by flip flop 102 on the first transition of the EPRF signal and scan line counter 104 is clocked by flip flop 102 on the second transition of the EPRF signal. Since scan line counter 104 is reset by a signal applied to a terminal 108 after the completion of each scanning sequence, scan line counter 104 provides a count signal that indicates the scan line associated with the video return signal being processed and thus indicates the angular coordinate of that scan line. This count signal is encoded into the first six bits of an addressing signal of a read only memory (ROM) 110 which stores 64 eight-bit digital words representing the cosine of each scan line and 64 eight-bit digital words representing the geometric correction factor described relative to FIG. 6. In this regard, since, in this exemplary embodiment of the invention, both the transducer 14' and the 128 scan lines are symmetric about the $\theta = 0$ reference coordinate, only 64 unique values of the $\cos \theta$ and 64 unique geometric correction factors are exhibited. Thus only this amount of data need be stored in ROM 110, if the count signal supplied by scan line counter 104 is encoded such that the equivalent decimal value thereof increases from zero to sixty-three as the first sixty-four scan lines of the surveillance field are being processed, remains equal to sixty-three as the sixty-fourth scan line is being processed and decreases by one as each successive scan line is being processed so that a value of zero is attained as the one hundred twenty-eighth scan line is being processed.

In the arrangement of FIG. 7, a six-bit address having the above-described characteristics is supplied by six exclusive OR gates 112 having the first input terminals thereof respectively connected for receiving the first six bits of the count signal supplied by scan line counter 104. Since the second input terminal of each exclusive OR gate 112 is supplied with the seventh bit of the signal supplied by scan line counter 104 via an inverter 114, the ROM 110 is addressed in the above-described manner. To address the ROM 110 so as to sequentially access the stored geometric correction factor and cosine function of the scan line of interest, a seventh bit of the ROM 110 addressing signal is supplied by the Q output of the flip flop 102. Since the signal supplied by the flip flop 102 is at logic level zero immediately following the first transition of the EPRF signal and is at logic level one after the conclusion of the EPRF signal (and remains at this level until the circuit of FIG. 7 is reinitialized when a surveillance pulse is transmitted along the nextmost scan line) the ROM 110 is initially addressed to access the geometric correction factor of the scan line of interest and, following the relatively short EPRF signal, is addressed to access the corresponding cosine value. Since the output terminals of ROM 110 are commonly connected to the digital input terminals of a D/A converter 116 and to the programming terminals of counter 94 and since the load terminal of counter 94 is connected to the Q output of flip flop 102, counter 94 is rapidly loaded with a count representing the proper geometric correction factor as signal processing along a particular scan line begins. Thereafter, the appropriate cosine factor is made available to the D/A converter 116 which supplies an analog signal to the frequency control terminal 118 of vertical VCO 32.

D/A converter 116 can be any of conventional devices that provide an analog output signal substantially proportional to the product of the applied digital signal and an applied analog signal. In FIG. 7 the analog signal applied to the D/A converter 116 is supplied to a terminal 120 by a suitable source of constant or selectable signal level and determines the overall range or depth of the region to be displayed. More specifically, when the angular coordinate of the scan line associated with the video return signal being processed is equal to or nearly equal to zero (i.e., the centermost scan lines), the value of the cosine of the angular coordinate is substantially one and the analog signal applied to the terminal 120 is established so that 256 pulses of vertical VCO 32 correspond to the distance through the object that is to be displayed between the upper and lower boundaries of the resulting image.

Figure 6:
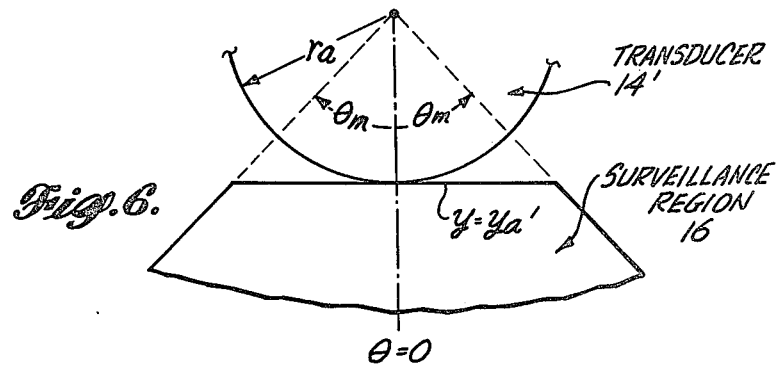
FIG. 6 diagrammatically depicts geometric relationships that can be important in some embodiments of the invention.

To start the vertical VCO 32 at a time coincident with the horizontal line $y_a'$ discussed relative to FIG. 6, the counter 94 is clocked down by the previously mentioned CLK A signal, which is coupled to a terminal 122. In this regard, the values stored in ROM 110 to represent the geometric correction factor for each scan line are established so that counter 94 will overflow at a time which corresponds to the intersection of the scan line of the video return signal being processed and the line $y=y_a'$. The counter overflow signal is coupled to the preset terminal of flip flop 92 to set the Q output to logical one and supply a signal to the terminal 124 which enables vertical VCO 32 so that a signal having the pulse repetition rate established by the D/A converter 116 is supplied to the terminal 126.

As previously described relative to the basic embodiment of FIG. 1, vertical VCO output pulses are not coupled to the A/D converter 28 until a time at which the video return signal corresponds to the signal reflection occurring from an incremental region at the intersection of the scan line of interest and the line $y=y_a$ of FIG. 2, where $y_a$ can be selected to be equal to or greater than $y_a'$. Relative to the object being imaged, this line is orthogonal to the $\theta=0$ reference coordinate and lies a predetermined distance below the surface of the imaged object.

In the arrangement of FIG. 7, the first vertical VCO output pulse that will be coupled to the A/D converter 28 is determined by the preimage counter 98. In particular, preimage counter 98 includes a flip flop 128 with the Q output terminal thereof connected to one input terminal of AND gate 96 and the clear terminal thereof connected to the Q output terminal of flip flop 102. The preset terminal of flip flop 128 is interconnected with the carry terminal of a counter 130 which is clocked down by the vertical VCO signal and loaded with a digitally encoded signal that is applied to terminals 132 during the previously mentioned initialization of the circuit of FIG. 7. Thus, counter 130 will supply a signal to the preset terminal of flip flop 128 only after a programmed number of pulses have been provided by vertical VCO 32. When this occurs the Q output of flip flop 128 sets, thus enabling AND gate 96. Since, as described below, the signal applied to the third input terminal of AND gate 96 is at logic level one during this portion of the operational sequence, the digital signal applied to the terminals 132 thus determines the depth at which A/D converter 28 of FIG. 1 obtains the first digitized signal sample to establish the previously described straight line upper boundary of the displayed image, i.e., the line $y=y_a$ in FIGS. 2 and 4.

The end image counter 100 of FIG. 7 is essentially a timing circuit that is activated by each EPRF pulse and supplies a signal that disables AND gate 96 after a predetermined time interval. With respect to the embodiment being described, end image counter 100 is arranged to exhibit a timing interval that is independent of the angular coordinate of the scan lines wherein 256 pulses of the vertical VCO signal are supplied to the A/D converter 28 when a video return signal associated with the centermost scan lines is being processed. As was described relative to the basic embodiment of the invention, this means that vertical VCO 32 will supply less than two hundred fifty-six signal pulses for scan lines having substantial angular coordinates and, as described relative to FIGS. 2 and 4, the lower boundary of the displayed image will thus be an arc of constant range or depth.

To provide a suitable timing signal, end image counter 100 of FIG. 7 includes a counter 134 that is clocked by a signal denoted as CLK B that is supplied to a terminal 138 by a conventional circuit arrangement. For example, the CLK B signal can be derived from the CLK A signal by using conventional counter arrangements to effect frequency division. The carry terminal of the counter 134 is connected to the preset terminal of a flip flop 140 having the Q output terminal thereof coupled to an input terminal of AND gate 96 via an inverter 142.

In operation, a digital signal that is established in view of the pulse repetition rate of the CLK B signal is applied to the programming terminals of counter 134. As the circuit of FIG. 7 is initialized by the EPRF pulse of each scan line, flip flop 140 is reset and counter 134 is loaded with the signal applied to the programming terminals 144. Thus, the Q output of flip flop 140 goes to logical zero and a logical one is supplied to the AND gate 96 by the inverter 142. When counter 134 has reached a count of zero, flip flop 140 is set and the signal supplied to AND gate 96 by inverter 142 goes to logical zero to thereby disable AND gate 96 and prevent further signal pulses of vertical VCO 32 from reaching A/D converter 28.

Figure 8:
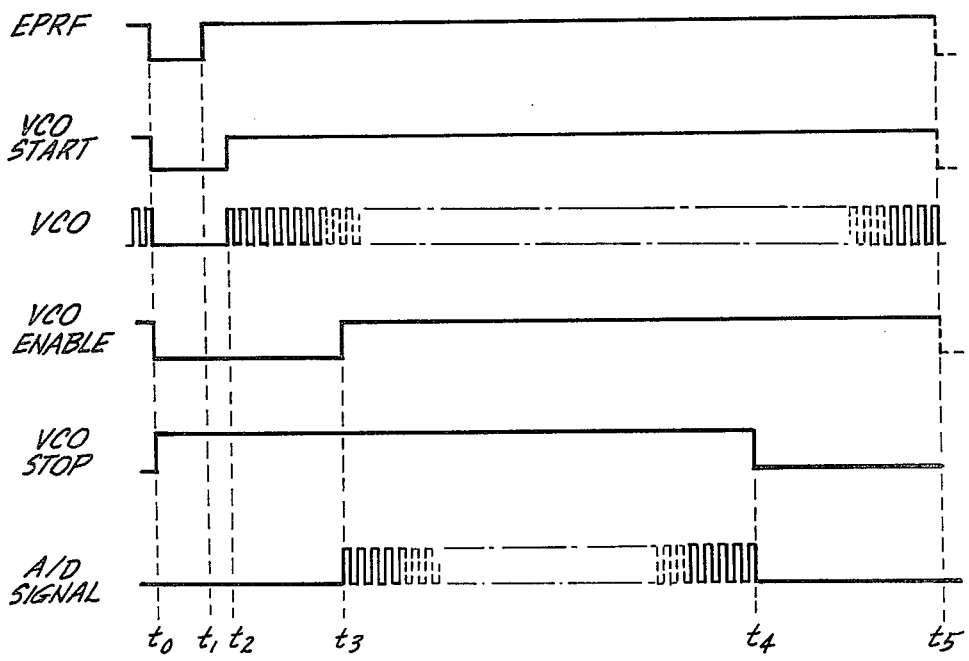
FIG. 8 depicts signals associated with the operation of the circuit depicted in FIG. 7.

The operation of the vertical VCO control logic of FIG. 7 can be summarized by reference to FIG. 8 which depicts the primary signals occurring during the time in which the A/D converter 28 of FIG. 1 processes the video return signal of a single scan line. As depicted in FIG. 8, circuit operation begins with the negative going transition of the EPRF signal at time $t_0$ of FIG. 8. As previously described, this signal transition initializes the circuit of FIG. 7 and, relative to FIG. 8, causes the VCO ENABLE signal (supplied by preimage counter 98) and the VCO START signal (supplied by flip flop 92) to go low. Thus, VCO 32 is turned off at time $t_0$ and does not supply an output signal. During the time interval of the EPRF pulse ($t_0$ to $t_1$), the appropriate geometric correction factor is loaded into the counter 94 which begins to count down following the second transition of the EPRF signal at time $t_1$. When the counter 94 has attained a count of zero, flip flop 92 is set to cause the VCO START signal to go high at time $t_2$. Thus, VCO 32 begins to supply a signal having a pulse repetition rate that is determined by the product of the depth reference signal and the cosine signal supplied by ROM 110. However, since the VCO ENABLE signal is low at this time, AND gate 96 of FIG. 7 is not enabled and no signal is coupled to the A/D converter.

When vertical VCO 32 begins to supply signal pulses at time $t_2$, counter 130 begins to count downwardly and, as previously described sets the flip flop 128 to supply the VCO ENABLE signal at a time $t_3$ which corresponds to the time at which the video return signal represents reflection occurring from the intersection of the scan line of interest and the previously described straight line boundary of the surveillance region to be displayed. As can be seen in FIG. 8, the VCO signals are coupled to the A/D converter 28 by AND gate 96 at time $t_3$ since the VCO STOP signal (supplied by end image counter 100) was set high at time $t_0$ and, as previously described, does not go low until a predetermined time interval has elapsed. Thus, as is depicted in FIG. 8, A/D converter 28 is supplied with the vertical VCO signal until time $t_4$. As previously noted, the time interval $t_3$ to $t_4$ is established to include 256 signal pulses when the angular coordinate of the scan line being processed is substantially 0°, i.e., when video return signals associated with the centermost scan lines are being processed. As is further depicted in FIG. 8, the circuit remains in this state until time $t_5$, at which time the circuit is reinitialized with scan line counter 104 being incremented by a count of one to supply the appropriate geometric correction factor and cosine data for operation with the next scan line.

FIG. 9 depicts an exemplary embodiment of horizontal VCO control logic 80 of FIG. 1 that is responsive to the horizontal and vertical sync signals supplied by a TV sync generator to control reading of the stored image information so that a television compatible signal is formed that represents the portion of the surveillance region that is to be displayed. As previously described, such horizontal VCO control logic controls the horizontal VCO 68 so that each row of image information will be coupled in a manner which: (1) causes the desired vertical placement of the image display on a TV screen by determining the first TV horizontal timing period that will contain image information; (2) causes proper horizontal placement of the image display on the TV screen by controlling the horizontal VCO 68 so that the first entry of each row of stored image information is read from memory at the proper time during the associated horizontal sweep interval; and (3) completes the necessary polar-to-Cartesian format conversion by varying the horizontal VCO pulse repetition rate on a row-by-row basis (i.e., horizontal sweep-to-horizontal sweep relative to the television video signal) and by modulating the horizontal VCO pulse repetition rate during the time in which each row of image information is read (i.e., during each horizontal sweep interval of the television signal). Relative to the arrangement of FIG. 9, desired vertical orientation of the image region is attained by a vertical placement control unit 150; the pulse repetition rate of horizontal VCO 68 is controlled on a line-by-line basis by a vertical ramp signal that is generated by a sweep generator 152 so that the instantaneous value of the ramp signal represents the number of horizontal sweep periods that have been produced during a particular vertical timing period of the television signal; the necessary modulation of the horizontal VCO within each horizontal sweep interval of the TV signal is effected by a circuit arrangement denoted as the horizontal rate modulation unit 154; and the time at which video information begins and ends within each horizontal sweep is established by respectively enabling and disabling the horizontal VCO 68 with "start sector" and "stop sector" timing signals produced by the sweep generator 152.

More specifically, the vertical placement control 150 of FIG. 9 includes a start display counter 156 and a stop display counter 158 which have the carry terminals thereof respectively connected to the preset terminal of a flip flop 160 and the preset terminal of a flip flop 162. The Q terminal of flip flop 160 and the $\overline{Q}$ terminal of flip flop 162 being connected to two input terminals of an AND gate 164 having the third input terminal thereof connected to the output terminal 166 of the horizontal VCO 68. Since the load terminals of counters 156 and 158 are connected to the output terminal of an inverter 168 that is supplied with the television vertical sync signal (by TV sync generator 41 of FIG. 1), the counters 156 and 158 are loaded with a digital that is supplied to the programming terminals thereof (170 and 172, respectively) at the beginning of each vertical timing period of the television timing signal. In this respect, the signal supplied to the programming terminals 170 of start display counter 156 represents the first line of the TV display which will contain image information and the digital signal supplied to the programming terminals 172 of stop display counter 158 represents the last horizontal line of the television display which includes image information. Depending on the situation at hand, the digital signals for programming the counters 156 and 158 can be effected through hard wired circuit connections, or appropriate digital signals can be supplied by selector switches or other conventional means of forming a parallel format digital signal. In any case, the signal supplied to the programming terminals 170 of counter 156 determines the number of lines of television display that will elapse before the upper boundary of the imaged region is displayed and the relative difference between the digital signal applied to the programming terminals 172 of the counter 158 and the programming terminals 170 of the counter 156 determines the number of television lines that will include image information (i.e., the number of rows of image information that will be read from image memory 36 of FIG. 1). For example, in the embodiment being described wherein 256 lines of the television display include image information, the difference between the digital signals applied to the programming terminals 172 and 170 is established so that 128 lines will be displayed during each of the two raster fields (two vertical timing periods) in which one complete frame of TV signal information is generated.

Continuing with the description of vertical placement control 150, it can be noted that the above-described operation is effected since the clear terminals of the flip flops 160 and 162 are connected to the output terminal of the inverter 168 and the clock terminals of counters 156 and 158 are connected to the output terminal of an inverter 174 that is supplied with the television horizontal sync signal. Thus, each vertical sync signal resets the flip flops 160 and 162 and the logical zero supplied by the Q output of flip flop 160, in effect, disables AND gate 164 so that signal pulses provided by horizontal VCO 68 are not coupled to the video multiplexor 66 of FIG. 1 (or other suitable apparatus for accessing image information within output buffer memory 38). When the counter 170 has counted down to zero, the next horizontal sync pulse sets the flip flop 160 to thereby enable AND gate 164. With AND gate 164 enabled, horizontal VCO 68 supplies signal pulses during each of the horizontal sweep periods until counter 158 overflows to set the flip flop 162 and disable AND gate 164. The flip flops 160 and 162 remain in this state until the arrival of the next vertical sync signal which resets the flip flops 160 and 162 and loads the counters 156 and 158 to thereby reinitialize the vertical placement control 150 for operation over the next television vertical timing period.

The manner in which horizontal VCO 68 is started at the proper time relative to the horizontal sync pulse of each time interval in which the television signal is to contain image information and the manner in which the pulse repetition rate of horizontal VCO 68 is controlled to complete the polar-to-Cartesian format conversion can be best understood upon understanding the operation of sweep generator 152.

In the depicted sweep generator 152, a ramp signal having a period that corresponds to the time interval between vertical sync pulses of the TV sync signal is generated by charging a capacitor 176 with a constant current that is supplied by a conventional transistor circuit arrangement which is schematically represented in FIG. 9 by the conventional current generator symbol 178. In particular, one terminal of the current source 178 is connected to a first terminal of capacitor 176 (terminal a in FIG. 9) and the anode of a diode 180 having the cathode thereof connected to the circuit supply voltage, $V_{dd}$. The second terminal of capacitor 176 (denoted as terminal b) is commonly connected to the output terminal of a differential amplifier 182, having a feedback resistor 184 connected between the output terminal and inverting input terminal, and one terminal of a capacitor 186. The second terminal of capacitor 186 is connected to circuit common and the capacitance value of capacitor 186 is substantially greater than the capacitance value of capacitor 176 (e.g., approximately fifty times as large in one realization of the depicted arrangement) so that terminal b of capacitor 176 is effectively clamped at a constant potential. To establish the fixed potential at terminal b of capacitor 176 the inverting and noninverting input terminals of amplifier 182 are connected to a D/A converter 188 of the type that supplies a differential current representative of the product of a digitally encoded signal and an analog signal that are respectively applied to the terminals 190 and terminal 192 of D/A converter 188. As will be realized upon understanding the operation of sweep generator 152, the digital and analog signals supplied to the D/A converter 188 establish the width to height ratio of the surveillance image that will be formed on a television screen when a TV receiver is driven by the signal supplied by the digital scan converter. In addition, the noninverting input terminal of amplifier 182 is connected to the output of a buffer amplifier 194 having its noninverting input terminal connected to the wiper arm of a potentiometer 196 that is connected between a terminal of fixed potential 198 and circuit common. Thus, the output current delivered by amplifier 182 (and hence the potential at terminal b of capacitor 176) is determined by both D/A converter 190 and the current supplied by buffer amplifier 194. In this respect, a resistor 200, connected from the output terminal of buffer amplifier 194 to an output terminal 202 of sweep generator 152 supplies a reference voltage hereinafter referred to as the "vertical center" potential, which is offset from the potential at terminal b of capacitor 176 by a predetermined amount. As shall become apparent, the vertical center potential does, in fact, correspond to the midpoint of eadh horizontal sweep interval of the TV horizontal sync signal and is utilized in determining the horizontal position of the surveillance sector on the roster scan display device.

With continued reference to FIG. 9, sweep generator 152 further includes a switch circuit 204 that is connected across capacitor 176 to discharge capacitor 176 and determine the time at which the above-mentioned ramp signal begins to increase in amplitude. In this respect, switch circuit 204 can be any conventional circuit arrangement which is operative to selectively place a low and high impedance path across capacitor 176 in accordance with the level of an applied control signal. Such circuits include, for example, conventional junction-type field-effect transistor (JFET) analog switches. In the arrangement of FIG. 9, the control signal of switching circuit 204 (identified as the "vertical ramp start" signal) causes switching circuit 204 to place a low impedance path across capacitor 176 at the beginning of each TV vertical timing period and remove the low impedance path after a predetermined number of horizontal timing periods have occurred. For example, such a signal can be obtained from the Q output of flip flop 160 or by utilizing an arrangement identical to counter 156 and flip flop 160 wherein the counter is programmed to count down from an appropriate value.

FIG. 10a depicts the ramp signal 206 that is provided by the above-described portion of sweep generator 152. In particular, as previously described, as the vertical sync pulse occurs at time $t_0$, the switching circuit 204 discharges the capacitor 176 and the potential at terminal a is substantially equal to the constant potential produced at terminal b by amplifier 182. When the switching circuit 204 is activated by the vertical ramp START signal (at time $t_1$ of FIG. 10) capacitor 176 begins to charge at a rate determined by current source 178 and ramp signal 206 linearly increases with time. As is depicted in FIG. 10a, in some realizations of sweep generator 152, ramp 206 may reach a maximum voltage of approximately $V_{dd}$ (indicated at time $t_2$) and remain at that level until the next vertical sync pulse when switching circuit 204 is again activated (time $t_3$). The limiting of the vertical ramp signal 206 at a potential near $V_{dd}$ does not affect the hereinafter described operation of the horizontal VCO control circuit of FIG. 9 as long as such limiting does not occur prior to the time at which flip flop 162 has been set, i.e., as long as the horizontal sweep periods of the television signal which contain image information have been generated.

As is indicated in FIG. 10b, sweep generator 152 also supplies a vertical ramp signal 208 that is, in effect, a mirror image of vertical ramp signal 206 about the vertical center potential. With reference to FIG. 9, the vertical ramp signal 208 is supplied by a differential amplifier 210 having the noninverting input terminal thereof connected to the output terminal of buffer amplifier 194 via a resistor 212 to thereby interconnect the noninverting input terminal of the amplifier 210 to the vertical center potential. The vertical ramp signal 206 of FIG. 10a is coupled to the inverting input terminal of the amplifier 210 via a buffer amplifier 214 having the input terminal thereof connected to terminal a of capacitor 176. More specifically, the output terminal of buffer amplifier 214 is coupled to the junction between a capacitor 216 and a resistor 218 with the second terminal of the capacitor being connected to circuit common and the second terminal of resistor 218 being connected to the inverting input terminal of amplifier 210. A feedback resistor 220 is interconnected between the inverting input terminal and output terminal of the amplifier 210 to thereby establish circuit gain and a capacitor 222 is connected between circuit common and the output terminal of amplifier 210 to eliminate any high frequency transients. In addition, the output terminal of the buffer amplifier 214 couples the ramp signal supplied at terminal a of capacitor 176 to an output terminal 224 of sweep generator 152. As shall be described hereinafter, the vertical ramp signal appearing at terminal 224 is utilized to vary the pulse repetition rate of horizontal VCO 68 on a line-by-line basis relative to the image to be displayed on the television screen.

In addition to the two above-described vertical ramp signals sweep generator 152 of FIG. 9 further includes a circuit for supplying an additional ramp signal having a period substantially equal to the horizontal sweep interval of the television sync signal. More specifically, in the arrangement of FIG. 9, a second transistorized current source 226 is interconnected between circuit common and the first terminal of a capacitor 228. The second terminal of the capacitor 228 is connected to circuit common so that the current source 226 linearly charges capacitor 228. To discharge the capacitor 228 as each horizontal sync interval begins, sweep generator 152 includes a voltage comparator 232 having the positive input terminal thereof connected for receiving the signal supplied by inverter 174 and the negative input terminal thereof connected to an appropriate reference voltage that is supplied to a terminal 234. To adequately discharge capacitor 228, the voltage comparator 232 is of the type having an open collector output stage with the output terminal of comparator 232 being connected to the junction between current source 226 and capacitor 228. Various other circuits can be used in place of voltage comparator 232 such as the previously mentioned conventional JFET analog switch.

In view of the above-described arrangement it can be recognized that the output terminal of comparator 232 switches to approximately circuit common potential during the duration of each horizontal sync pulse so that capacitor 228 is substantially discharged to zero volts. Following each horizontal sync pulse comparator 232 changes states and capacitor 228 is linearly charged by current source 226 until the occurrence of the next horizontal sync pulse.

To complete sweep generator 152 of FIG. 9 and provide the previously mentioned signals that start and stop horizontal VCO 68 at the proper time relative to the snyc pulse of each horizontal sweep interval in which the television signal includes image information, the depicted circuit arrangement includes a comparator 236 and a comparator 238. As can be seen in FIG. 9, the negative input terminal of comparator 236 and the positive input terminal of comparator 238 are connected for receiving the horizontal ramp signal that is supplied at the junction between current source 226 and capacitor 228. In addition, the positive input terminal of comparator 236 receives the vertical ramp signal supplied at terminal a of capacitor 176 and the negative input terminal of comparator 238 receives the inverted vertical ramp signal supplied by the amplifier 210. The output terminals of comparators 236 and 238 are respectively connected to output terminals 240 and 242 of sweep generator 152 which are, in turn, connected to two input terminals of an AND gate 244. Further, to inhibit AND gate 244 during the horizontal retrace interval so that horizontal VCO 68 is not operating when image information is being loaded into output buffer memory 38 of FIG. 1, the third input terminal of AND gate 244 is connected for receiving the signal supplied by inverter 174.

The operation of comparators 236 and 238 and AND gate 244 to enable horizontal VCO 68 in the desired manner can best be understood with reference to FIG. 11 which illustrates a portion of the above-described vertical ramp signals 206 and 208 that includes the time at which switching circuit 204 is activated to allow capacitor 176 to be charged by current source 178 and three successive horizontal ramp signals. Since, as can be seen in FIG. 9, the signal which appears across the input terminals of comparator 238 is substantially equal to the difference between the horizontal ramp signal and the inverted vertical ramp signal 208 it can be recognized that the start sector signal supplied by comparator 238 will go to logical one at a time that corresponds to the time in FIG. 11a at which the positive going portion of the horizontal ramp signal intersects the inverted vertical ramp signal 208. Similarly, the comparator 238 will switch back to logical zero during the retrace interval of the horizontal sync signal (i.e., the negative going portion of the horizontal ramp signal of FIG. 11a) at a time which again substantially corresponds to the time at which the horizontal ramp signal intersects the inverted vertical signal 208. For example, FIG. 11b illustrates the relationship between the horizontal sync signal ($\overline{\text{H SYNC}}$) provided by the inverter 174 of FIG. 9 and the start sector signal that is provided by comparator 238. In this respect, the first retrace interval of the horizontal sync signal in FIG. 11b ends at time $t_1$ to start the horizontal ramp signal and the horizontal ramp signal intersects the inverted vertical ramp signal 208 at time $t_2$ to set the start sector signal to the logical one state. As the horizontal ramp signal decreases during the next retrace interval ($t_4$ to $t_5$ in FIG. 11), the horizontal ramp signal becomes more negative than the inverted vertical ramp signal 208, setting the start sector signal to logical zero. Continuing in this manner, the positive going portion of the next horizontal ramp signal crosses over the inverted vertical ramp signal 208 at time $t_6$ to again set the start sector signal to a logical one and the comparator 238 is activated during the next retrace interval ($t_8$ to $t_9$). Since the inverted ramp signal 208 decreases linearly during this time period it can be recognized that the time interval between the end of the first sync pulse and the time at which the start sector signal goes to a logical one ($t_2-t_1$) corresponds to an initial portion of one horizontal sweep of the electron beam of a television receiver being driven by the horizontal and vertical sync signals from which the horizontal and vertical ramp signals of FIG. 11 were derived. Further, because the inverted vertical ramp signal 208 of FIG. 11a decreases linearly with time, it can be recognized that the time interval ($t_6-t_5$) that occurs between the end of the next horizontal sync pulse and the time at which comparator 238 sets the start sector signal equal to a logical one is greater than the corresponding portion of the first horizontal timing period. Thus, considering each successive horizontal timing period, i.e., successively lower horizontal lines on a television display driven by the sync signals, it can be recognized that the time elapsing between each horizontal sync pulse and the time at which the start sector signal changes from logical zero to logical one linearly decreases in accordance with the slope of the inverted vertical ramp signal 208. As shall be described in more detail hereinafter, these transitions of the start sector signal determine the time at which horizontal VCO 68 begins to operate during each horizontal timing period. Relative to a television display driven by the horizontal and vertical sync signals applied to the circuit of FIG. 9 this means that as the television receiver electron beam traces out successively lower horizontal lines, the first portion of the image information displayed will be closer to the left-hand side of the screen. Thus, with the width reference applied to D/A converter 188 and the current value of constant current source 178 suitably adjusted, the left-hand boundary of the displayed surveillance region exhibits polar perspective that is identical to that of the original surveillance field.

Referring again to FIG. 9, it can be recognized that the potential supplied to the comparator 236 is substantially equal to the vertical ramp signal 206 minus the horizontal ramp signal. Thus, as is shown in FIG. 11, the stop sector signal supplied by comparator 236 will switch to logical zero at each crossover of the horizontal ramp signal and vertical ramp signal 206 that occurs during the positive going portions of the horizontal ramp signal, i.e., time $t_3$, $t_7$ and $t_{11}$ in FIG. 11. Similarly, the stop sector signal will switch to logical one during each retrace interval of the horizontal sync signal at a time that corresponds to the crossover of the horizontal ramp signal and vertical ramp signal 206. Thus, the time interval between the logical one to logical zero transitions of the stop sector signal and the beginning of the next horizontal sweep interval (the nextmost retrace) decreases with each successive horizontal timing period. Since this determines the time at which the image portion of successive horizontal sync intervals ends, the right-hand boundary of the image display that will be formed on a television screen extends downwardly toward the edge of the screen and exhibits proper polar perspective relative to the original surveillance field. Because of the manner in which image information is stored it can be shown that the generation of the above-described stop sector signal is not absolutely necessary in forming a signal for displaying the image information with proper polar perspective. However, it has been found that the use of the stop sector signal to disable horizontal VCO 68 is advantageous in that the right-hand boundary of the image formed on a television screen will be well defined and not exhibit a somewhat ragged appearance.

Considering the above-described operation of the comparators 236 and 238 in generating the stop sector and start sector signals it can thus be recognized that AND gate 244 supplies a VCO enable signal to enable horizontal VCO 68 for a predetermined time during each horizontal sync interval. In this respect and as indicated above, the time interval over which AND gate 244 supplies a VCO enable signal to horizontal VCO 68 (i.e., time intervals $t_2$ to $t_3$, $t_6$ to $t_7$, and $t_{10}$ to $t_{11}$ in FIG. 10b) increases with each successive horizontal timing period. Further, because of the above-described characteristics of the stop sector and start sector signals, the time interval elapsing between the end of one sync interval and the start of the VCO enable signal and the time interval elapsing between the end of the VCO enable signal and the start of the next horizontal timing period both linearly decrease with successive horizontal timing periods. Stated otherwise, the time in which VCO enable signal is at logical one is symmetric about the midpoint of each sync interval (as determined by the vertical center potential) and linearly increases with each successive horizontal timing period.

Referring again to FIG. 9, the manner in which horizontal VCO 68 is controlled to linearly decrease the pulse repetition rate as successive rows of image information is read from buffer memory 38 (i.e., during successive horizontal timing periods which contain image information) and is controlled to modulate the pulse repetition rate as each row of image information is read (i.e., during each horizontal timing period) can now be understood. In particular, in the arrangement of FIG. 9, the previously described vertical center potential and vertical ramp signal that is coupled to the terminal 224 of sweep generator 152 are connected to the differential input terminals of a D/A converter 248 having the output terminal thereof connected to the frequency control terminal 250 of horizontal VCO 68. As previously described and as can be seen in FIG. 11a, the difference between the vertical center potential and the vertical ramp signals is a signal that remains constant until the sweep generator switching circuit 204 is activated and the capacitor 176 begins to charge. The signal then increases linearly with time and hence linearly increases relative to the remaining horizontal timing periods of each vertical timing period. Assuming for the moment that the digital signal applied to D/A converter 24 is constant, the signal supplied by D/A converter 248 is thus constant for a predetermined number of horizontal timing periods of each vertical sync interval and then linearly increases with each successive horizontal timing period. With the particular arrangement employed as horizontal VCO 68 of the circuit of FIG. 9, this linearly increasing signal causes a corresponding linear decrease in pulse repetition rate. Thus, the horizontal VCO pulse repetition rate is controlled in the desired manner to decrease the rate at which successive rows of image information are read from the buffer memory 238 of FIG. 1 (i.e., horizontal VCO operates at a slower pulse repetition rate with each successive line that is formed on a television screen. It will, of course, be recognized that if the voltage-controlled oscillator utilized as horizontal VCO 68 exhibits a frequency control characteristic wherein the pulse repetition rate is directly proportional to the applied signal, the inverted vertical ramp signal supplied by the sweep generator 152 can be utilized.

To vary or modulate the pulse repetition rate of horizontal VCO 68 during each horizontal timing period (i.e., as each row of image information is read from the buffer memory 38 of FIG. 1), horizontal rate modulation unit 154 of FIG. 9 includes a counter 252 having its load terminal connected to the output terminal of the inverter 174 and its clock up terminal connected to the output terminal 166 of horizontal VCO 68. In this arrangement, the counter 252 is loaded with a count of zero during the retrace period of each horizontal timing interval and the counter is incremented in synchronism with each signal pulse supplied by horizontal VCO 68. The count signal supplied by the counter 252 is coupled to an address encoder 254 which is similar to the exclusive OR arrangement described relative to PRR control 90 of FIG. 7. In particular, since the surveillance region to be displayed is spatially symmetrical about the $\theta=0$ reference coordinate (i.e., a vertically extending centerline of the region to be displayed), the previously described correction factors that vary horizontally as a function of the angular coordinate of the associated scan lines are symmetric about the midpoint of each line of image information. Thus, in the example being described, wherein one hundred twenty-eight radially extending scan lines are employed, only sixty-four unique values of the modulating signal are necessary. Hence, the sixty-four values can be stored in a programmable read only memory 256 at memory locations that are addressable by address signals ranging between the binary equivalent of zero and the binary equivalent of sixty-four. In this respect, address encoder 254 supplies an address signal that successively goes from zero to sixty-three as the count within counter 252 increments from zero to sixty-three, remains at sixty-three when the counter attains a count of sixty-four, and decrements from sixty-three to zero as the counter 252 successively counts up from sixty-four to one hundred twenty-eight. Additionally, it has been found that satisfactory operation can be attained in some realizations of the invention without supplying a different modulation value for each of the scan lines. For example, it has been found satisfactory to utilize a single modulation value for two successive pulses of the horizontal VCO signal. Thus, it is often possible to decrease the amount of storage required in PROM 256 by a factor of 2. In such a case, a conventional divide-by-two circuit is interconnected between the output terminal 166 of horizontal VCO 68 and the clock terminal of counter 252 and the address encoder 254 is suitably configured to provide an appropriate addressing signal. For example, when one hundred twenty-eight scan lines are employed, counter 252 will count between zero and sixty-three and address encoder 254 will include an arrangement of exclusive OR gates or other logic circuits which cause the thirty-two stored values to be accessed in the above-described manner.

Regardless of the exact arrangement of horizontal rate modulation unit 154 it can be recognized that the signal supplied to the horizontal VCO frequency control terminal 250 by the D/A converter 248 is modulated in a predetermined manner during each horizontal timing interval (as each row of information is read from output buffer memory 38 of FIG. 1). As described relative to FIG. 5, modulating the pulse repetition rate of horizontal VCO 68 as a function of the tangent of the angular coordinate of the associated surveillance system scan line completes the desired polar-to-Cartesian format conversion so that all elemental regions of the image that will be formed on the television screen will exhibit spatial orientation identical to that within the object being scanned.

As described relative to the basic arrangement of FIG. 1, it is often advantageous to provide additional digital signal conditioning between video multiplexer 66 and D/A converter 60. For example, in the exemplary embodiment of the invention described herein wherein the surveillance region is defined by one hundred twenty-eight radially extending scan lines and thus each horizontal sweep of a television receiver displaying the imaged region includes a maximum of one hundred twenty-eight image elements, fairly abrupt changes in intensity can be experienced as the electron beam of the television receiver is moved through one horizontal sweep. To provide a more gradual change in intensity between adjacent regions of each television sweep that forms the displayed image, the digital circuit arrangement depicted in FIG. 12 has been employed as the video postprocessor unit 74 of FIG. 1.

Figure 12:
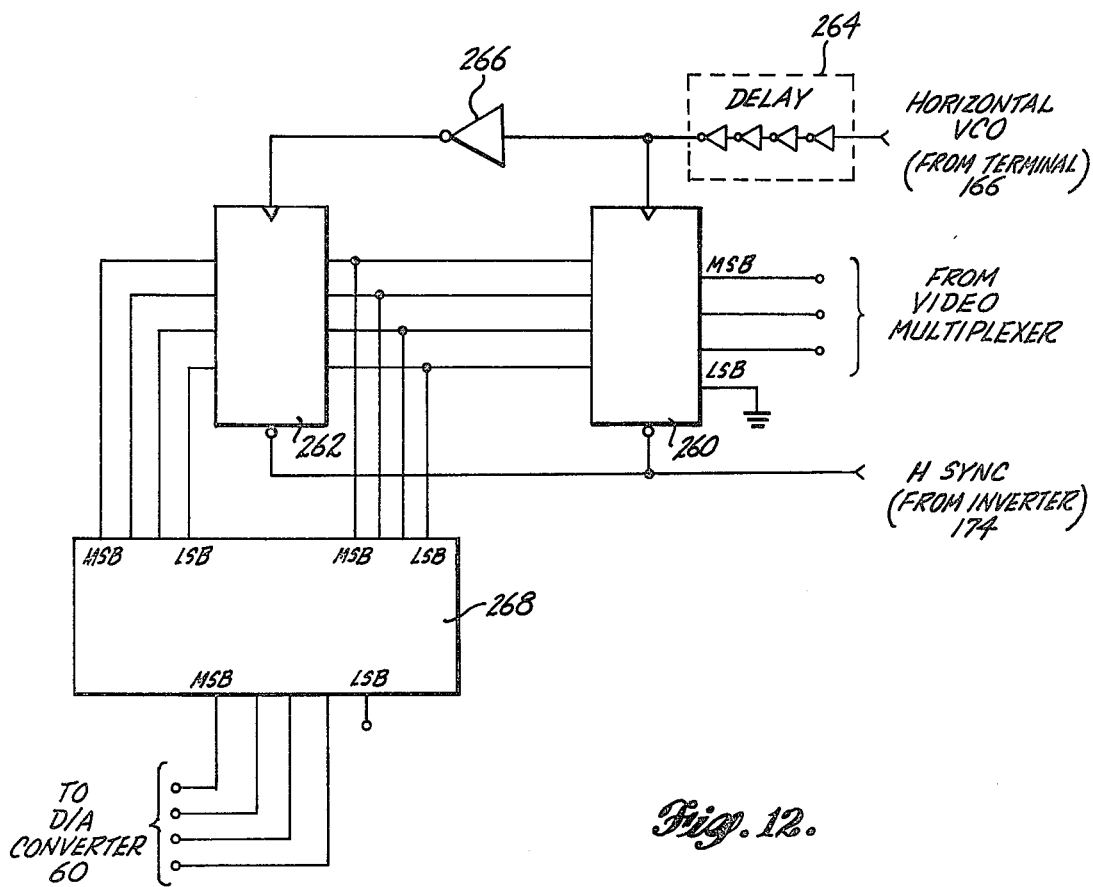
FIG. 12 schematically depicts a circuit arrangement that can be utilized as the video postprocessor of FIG. 1.

As can be seen in FIG. 12, this postprocessor unit includes a selector circuit 260 and a selector circuit 262 with the clear terminals of selectors 260 and 262 being connected for receiving the logical negation of the horizontal sync signal ($\overline{\text{H SYNC}}$ in FIG. 12, which can be supplied by the inverter 174 of FIG. 9). To clock the selectors 260 and 262, the clock terminal of selector 260 is connected to the output terminal 166 of horizontal VCO 68 via a time delay 264 and the output of the time delay 264 is connected to the clock terminal of selector 262 by an inverter 266. In some instances, the delay 264 may not be necessary, but ensures that operation of the depicted postprocessor will not be affected by transient conditions that can exist in the data supplied by video multiplexer 66 at instances of time that correspond to signal transitions in the horizontal VCO output signal. In any case, the data input terminals of the selector 260 are connected so that the least significant bit (lsb) of each data word received by selector 260 is at logical zero and the three remaining data input terminals are connected for receiving the three-bit digitally encoded signal supplied by video multiplexer 66. The four output leads of selector 260 are connected to the input terminals of selector 262 and are also connected for supplying a four-bit digitally encoded signal to a digital adder circuit 268. In addition, the four output terminals of selector 260 are connected for supplying a second four-bit digital word to the adder 268 and the four most significant bits of the five-bit output provided by adder 268 are connected to the input of D/A converter 60 of FIG. 1.

With this arrangement, the positive going transitions of each signal pulse supplied by horizontal VCO 68 couple a four-bit digital word into the selector 260 that has an equivalent decimal value equal to twice the decimal value of three-bit signal supplied by video multiplexer 66. Further, each negative going transition of the signal pulses supplied by horizontal VCO 68 cause the four-bit digital signal within selector 260 to be coupled into selector 262. Thus, during the portion of each horizontal VCO signal pulse that occurs after each positive going signal transition, selector 260 supplies a digital signal equivalent to twice the decimal value of the current signal being supplied by video multiplexer 66 of FIG. 1 and selector 262 supplies a digital signal equivalent to twice the decimal value of the previous three-bit digital word supplied by video multiplexer 66. Because only the four most significant bits of the output signal supplied by digital adder 266 are coupled to D/A converter 60, a four-bit digital signal substantially equal to one-half the sum of each pair of successive digital words supplied by video multiplexer 66 are coupled to D/A converter 60. On the other hand, during each portion of the horizontal VCO signal pulse that occurs after each negative going signal transition, both selectors 260 and 262 supply digital signals equivalent to twice the value of the digital signal that is currently supplied by video multiplexer 66. Thus, during this portion of each horizontal VCO signal pulse, the digital adder 268 supplies a four-bit signal that is equivalent to twice the value of the currently supplied three-bit digital word.

Thus, it can be recognized that the arrangement of FIG. 12 increases the bit level of the signal supplied by video multiplexer 66 to a four-bit signal that will provide sixteen possible shades ranging from black to white when the signal supplied by the digital scan converter is displayed on a television receiver. Further, it can be recognized that the illustrated video postprocessor of FIG. 12 effectively doubles the number of picture elements within each horizontal timing interval by, in effect, inserting an additional digital word between successive digital words supplied by video multiplexer 66 with the inserted digital word having a value substantially half-way between the associated pair of digital words supplied by video multiplexer 66. Thus, when the signal supplied by D/A converter 60 is displayed on a television receiver, the imaged region exhibits satisfactory contrast without exhibiting distracting abrupt changes between adjacent incremental regions thereof.

It will be recognized by those skilled in the art that the embodiments of the invention disclosed and described are exemplary in nature and that various changes and modifications can be made without departing from the scope and the spirit of the invention. Accordingly, it is intended that the claims set forth hereinafter not be deemed restricted to the details of the illustrations as such.

The embodiments of the invention in which an exclusive properly or privilege is claimed are defined as follows:

1. A digital scan converter for use with a scanning system which applies a sequence of n video return signals having a one-to-one correspondence with n radially extending scan lines that are angularly spaced apart from one another about the azimuthal axis of a polar coordinate system to define a sectorial surveillance region, each of said video return signals representing signal reflection occurring along said corresponding scan line, said digital scan converter for supplying signal information representative of at least a portion of said sectorial surveillance region relative to a Cartesian coordinate system wherein the first axis thereof is substantially parallel to said azimuthal axis of said polar coordinate system and the second axis of said Cartesian coordinate system is perpendicular to the first axis thereof, said digital scan converter comprising:

signal sampling means connected for receiving said sequence of n analog signals, said signal sampling means including means for digitizing each of said analog signals at a rate proportional to the cosine of the angle between said corresponding scan line and said azimuthal axis of said polar coordinate system to supply n ordered sets of data values, the successive data values of each said ordered set of data values representing signal reflection occurring from incremental regions of said surveillance region that are located along said corresponding scan line at equally spaced apart positions relative to said first axis of said Cartesian coordinate system;

memory means connected for receiving and storing said n ordered sets of data values, said memory means being addressable for accessing those ones of said data values that correspond to incremental regions of said surveillance region that are equally spaced apart from said second axis of said Cartesian coordinate system by a predetermined distance as an ordered set of data values in which successive data values are associated with the successive analog signals supplied by said surveillance system; and memory control means connected to said memory means for sequentially accessing said sets of data values corresponding to said equally spaced apart incremental regions in order of increasing distance from said second coordinate axis of said Cartesian coordinate system, said memory control means including means for reading said sets of accessed data values at a rate proportional to the distance between said corresponding incremental regions of said surveillance region and said second coordinate axis of said Cartesian coordinate system to supply said signal information relative to said Cartesian coordinate system.

2. The digital scan converter of claim 1 wherein said memory control means further includes means for modulating the rate at which each of said sets of accessed data values are read as a function of the angle between the scan line corresponding to said associated analog signal and said azimuthal axis of said polar coordinate system.

3. The digital scan converter of claims 1 or 2 wherein said signal sampling means further includes means for supplying the first data value of each of said n sets of data values at the time at which each of said first data values corresponds to an incremental region of said surveillance region that is located a predetermined distance from said second axis of said Cartesian coordinate system.

4. The digital scan converter of claim 3 wherein said memory control means further includes timing means responsive to periodic synchronization pulses of an applied signal for reading a single set of said accessed data values in response to each of said synchronization pulses.

5. The digital scan converter of claim 4 wherein said memory control means further includes means for establishing the time at which the first data value of each of said accessed sets of data values is read relative to the time at which said synchronization pulse occurs and means for varying the time elapsing between the occurrence of said synchronization pulse and the reading of said first data value as a function of said distance between said corresponding incremental region of said surveillance region and said second axis of said Cartesian coordinate system.

6. The digital scan converter of claim 5 further comprising digital-to-analog converter means connected for receiving said data values read by said memory control means to supply said signal information relative to said Cartesian coordinate system as an analog signal.

7. A digital scan converter for supplying an analog signal representing signal information that is supplied by a scanning system of the type wherein said scanning system provides a sequence of discrete analog signals that are associated with a plurality of radially extending scan lines which are angularly spaced apart from one another and referenced to a polar coordinate system, said digital scan converter comprising:

signal sampling means connected for receiving said sequence of analog signals, said signal sampling means including means for digitizing each of said analog signals at a rate that is determined by the pulse repetition rate of an applied first clock signal to supply an ordered set of digitally encoded signals representative of each of said analog signals;

first signal generating means for supplying said first clock signal to said signal sampling means, said first signal generating means including means for supplying said first clock signal at a pulse repetition rate proportional to the cosine of the azimuthal angle of the scan line associated with the analog signal currently being supplied to said signal sampling means by said scanning system;

memory means connected for receiving said ordered sets of digitally encoded signals supplied by said signal sampling means, said memory means for storing values representative of each digitally encoded signal of said sequences of digitally encoded signals, said memory means being addressable to partition said memory means as a rectangular array of storage locations having a predetermined number of columns and a predetermined number of rows;

memory control means operably interconnected with said memory means and said signal sampling means for loading values corresponding to successive sets of digitally encoded signals into successive column locations of said rectangular array of storage locations with values corresponding to each particular ordered set of digitally encoded words being located into the successive row locations of a single column of said rectangular array of storage locations, said memory control means further including means for sequentially accessing said memory means on a row-by-row basis relative to said rectangular array of storage locations;

data means for reading the values stored as rows of said rectangular memory array to form a sequence of digitally encoded signals representative of each row of said stored values, said data means for reading said values being responsive to an applied second clock signal and including means for sequentially reading the values within a particular row of said rectangular memory array at a rate determined by the pulse repetition rate of said second clock signal;

second signal generating means for supplying said second clock signal, said second signal generating means including means for varying said pulse repetition rate of said second clock signal on a row-by-row basis relative to said memory array of said memory means to decrease said pulse repetition rate as each successive row of stored values is read from said memory means; and digital-to-analog signal conversion means connected for receiving said sequence of digitally encoded signals representative of each of said rows of stored values, said digital-to-analog signal conversion means for supplying said analog output signal representative of said signal information.

8. The digital scan converter of claim 7 further comprising modulation means for varying the pulse repetition rate of said second clock means during each time interval in which the values within one of said rows of stored values are read from said memory means, said modulation means including means for increasing and decreasing said pulse repetition rate of said second clock signal as a function of the column location of the value currently being read.

9. The digital scan converter of claim 8 wherein said modulation means includes means for varying said pulse repetition rate of said second clock signal in accordance with the tangent of the azimuthal angle of the scan line that is associated with the analog signal that corresponds to the column location of the particular value being read.

10. The digital scan converter of claims 7, 8 or 9 wherein said second signal generating means further includes means for starting said second clock signal at a predetermined time that is functionally related to the row location of the row of data values currently being read.

11. The digital scan converter of claim 10 wherein said first signal generating means further includes means for selectively coupling said first clock signal to said sampling means after a predetermined number of clock pulses have been supplied by said first signal generating means and means for interrupting the flow of said first clock signal to said signal sampling means a predetermined time after said surveillance system begins to supply each of said discrete analog signals to said signal sampling means.

12. A digital scan converter for use with a surveillance system of the type which sequentially emits pulses of energy along a series of n radially extending scan lines that collectively define a sectorial surveillance system, with said scan lines being angularly spaced apart from one another relative to the azimuthal axis of an associated polar coordinate system to supply a sequence of n analog signals having a one-to-one correspondence with said n scan lines with each of said n analog signals representing signal reflection occurring along said corresponding scan line, said digital scan converter for supplying a video information signal representative of a predetermined portion of said sectorial surveillance region for driving a display device which operates on the basis of a Cartesian coordinate system, said video information signal causing said display device to display said predetermined portion of said surveillance region in an orientation wherein said azimuthal axis of said polar coordinate system associated with said scanning system is substantially parallel to the first axis of said Cartesian coordinate system that is associated with said display device, said video information signal including consecutive signal intervals corresponding to m lines of image display that are spaced apart from one another and substantially parallel to the second axis of said Cartesian coordinate system of said display device, said digital signal converter comprising:

an analog-to-digital converter circuit connected for receiving each of said n analog signals supplied by said surveillance system, said analog-to-digital converter being responsive to an applied first clock signal for supplying a series of digital signal values representative of signal reflection occurring from equally spaced apart incremental regions along the scan line associated with the particular one of said n analog signals that is currently being supplied by said surveillance system;

first clock means connected for supplying said first clock signal to said analog-to-digital converter, said first clock means including means for establishing the pulse repetition rate of said first clock signal proportional to the magnitude of an applied first control signal;

first clock control means connected for supplying said first control signal to said first clock means, said first clock control means including means for establishing said first control signal proportional to the cosine of the angle formed between said azimuthal axis and the scan line associated with that one of said n analog signals currently being supplied by said surveillance system, said first clock control means further including means for determining the number of digital signal values produced by said analog-to-digital converter during the time interval during which each particular one of said n analog signals is supplied by said surveillance system including means for establishing said number of digital signal values equal to m when an analog signal that is associated with a scan line which forms the smallest angle with said azimuthal axis is supplied by said surveillance system;

memory means connected for receiving and storing said digital signal values supplied by said analog-to-digital converter, said memory means being addressable as a rectangular memory array having n column addresses and m row addresses;

memory control means interconnected with said memory means for loading each series of digital signal values supplied by said analog-to-digital converter into one of said n columns of said memory array with said series of digital signal values representing said n successive analog signals being loaded into corresponding successive column addresses of said memory array, and with the successive digital signal values of each of said series of digital signal values being loaded into successive row addresses of said memory array, said memory control means further including means for accessing the digital signal values stored at each of said row addresses of said memory array;

digital signal means connected to said memory means for sequentially reading the digital signal values stored at each row address that is accessed by said memory control means, said digital signal means including means responsive to an applied second clock signal for sequentially reading the digital signal values of an accessed row address at a rate that is determined by the pulse repetition rate of said second clock signal;

second clock means connected for supplying said second clock signal to said data signal means, said second clock means including means for establishing the pulse repetition rate of said second clock signal proportional to the magnitude of an applied second control signal;

second clock control means connected for supplying said second control signal to said second clock means, said second clock control means including means for establishing said second control signal proportional to the row address of the particular row of digital signal values being accessed by said memory control means to decrease said pulse repetition rate of said second clock signal as successive rows of digital signal values are accessed; and a digital-to-analog converter circuit connected for receiving said digital signal values as they are successively read by said digital signal means, said digital-to-analog converter for supplying said video information signal that is supplied by said digital scan converter.

13. The digital scan converter of claim 12 wherein said second clock control means further includes modulation means for varying the rate at which successive digital signal values of each row of accessed digital signal samples are read as a function of the column address of the digital signal value being read.

14. The digital scan converter of claim 13 wherein said modulation means includes means for establishing said variation in reading rate proportional to the tangent of the angle formed between said azimuthal axis and the scan line that corresponds to the analog signal resulting in the digital signal value stored at each particular column address of said row of digital signal values being read.

15. The digital scan converter of claims 12, 13 or 14 wherein said means for determining said number of digital signal values produced by said analog-to-digital converter comprises means for selectively coupling said first clock signal to said analog-to-digital converter at the time at which the analog signal currently being supplied by said surveillance system corresponds to signal reflection occurring from an incremental region of said surveillance region that is to be displayed on said first one of said m lines of image display and means for disconnecting said first clock signal from said analog-to-digital converter a predetermined time after said surveillance system emits the pulse of energy along the scan line that corresponds to said analog signal currently being supplied by said surveillance system.

16. The digital scan converter of claim 15 wherein said first clock means is energized and deenergized by an applied third control signal and said first clock control means includes means for supplying said third clock signal at a value which energizes said first clock means coincident with the time at which said analog signal currently being supplied by said surveillance system corresponds to signal reflection occurring from an incremental region of said surveillance region that is located a predetermined distance from said incremental regions that are to be displayed on said first line of said m lines of said image display relative to said second coordinate axis of said Cartesian coordinate system and means for supplying said third control signal at a value that deenergizes said first clock means at a time no later than the time at which said surveillance system supplies the next signal of said sequence of n analog signals.

17. The digital scan converter of claim 16 wherein said display device to be driven by said video information signal is a raster-scan television system and each of said consecutive intervals of said video information signal correspond to one horizontal sweep period of said raster-scan television system, said digital scan converter further comprising signal generating means for supplying a horizontal sync signal for determining the horizontal sweep intervals of said raster-scan television system and for supplying a vertical sync signal for vertical timing of said raster-scan television system and an output buffer memory connected to said memory means for temporarily storing the digital signal values stored at each particular row address of said memory means, said output buffer memory means being responsive to said horizontal sync signal for reading the row of digital signal values accessed by said memory control means into said output buffer memory during the retrace interval of one of said horizontal sweep intervals and for supplying that row of said digital signal values for reading by said digital signal means during the nextmost subsequent horizontal sweep interval.

18. The digital scan converter of claim 17 wherein said second clock means is energized and deenergized by an applied fourth control signal and said second clock control means includes means responsive to said horizontal sync signal for supplying said fourth control signal at a level that deenergizes said second clock means until a predetermined number of horizontal timing intervals of each vertical timing period of said raster-scan television system have occurred.

* * * * *